United States Patent
Mullen

(10) Patent No.: US 9,952,662 B2
(45) Date of Patent: Apr. 24, 2018

(54) WIRELESS DEVICES WITH FLEXIBLE MONITORS AND KEYBOARDS

(71) Applicant: Jeffrey David Mullen, Pittsburgh, PA (US)

(72) Inventor: Jeffrey David Mullen, Pittsburgh, PA (US)

(*) Notice: Subject to any disclaimer, the term of this patent is extended or adjusted under 35 U.S.C. 154(b) by 0 days.

(21) Appl. No.: 15/228,578

(22) Filed: Aug. 4, 2016

(65) Prior Publication Data

US 2017/0344105 A1 Nov. 30, 2017

Related U.S. Application Data

(63) Continuation of application No. 14/171,748, filed on Feb. 3, 2014, now Pat. No. 9,442,563, which is a
(Continued)

(51) Int. Cl.
*G06K 1/16* (2006.01)
*H05K 5/00* (2006.01)
(Continued)

(52) U.S. Cl.
CPC ........... *G06F 3/011* (2013.01); *G02B 27/017* (2013.01); *G06F 1/163* (2013.01); *G06F 1/1605* (2013.01); *G06F 1/1624* (2013.01); *G06F 1/1626* (2013.01); *G06F 1/1637* (2013.01); *G06F 1/1639* (2013.01); *G06F 1/1647* (2013.01); *G06F 1/1652* (2013.01); *G06F 1/1666* (2013.01); *G06F 1/1669* (2013.01); *G06F 1/1671* (2013.01); *G06F 1/1694* (2013.01); *G06F 3/014* (2013.01); *G06F 3/0202* (2013.01); *G06F 3/0221* (2013.01); *G06F 3/03541* (2013.01); *G06F 3/045* (2013.01); *G06T 19/006* (2013.01); *G09F 9/301* (2013.01); *H01H 13/86* (2013.01); *H04M 1/0268* (2013.01);
(Continued)

(58) Field of Classification Search
CPC ...... G06F 1/1624; G06F 1/1626; G06F 1/163; G06F 1/1639; G06F 1/1647; G06F 1/1652; G06F 1/1666; G06F 1/1671; G06F 1/1694; G06F 3/011; G06F 3/014; G06F 3/0202; G06F 3/0221; G06F 3/045
USPC ............ 361/679.21, 679.26, 679.3, 679.55, 361/679.56, 679.01, 679.02, 679.03; 345/8
See application file for complete search history.

(56) References Cited

U.S. PATENT DOCUMENTS 5,267,708 A 12/1993 Monson et al.
5,613,223 A 3/1997 Ross et al.
(Continued)

*Primary Examiner* — Anthony Haughton

(57) ABSTRACT

A portable device (e.g., a wireless device such as a cell phone) is provided with a flexible keyboard and a flexible display screen. Such flexible components may be stored in the housing of the portable device when not in use. The flexible display screen and flexible keyboard may be expanded from the housing when the flexible components are utilized by a user. Non-flexible display and input components may be provided on the exterior of the portable device such that the device may be used, in some form, while the flexible components are stored. In one embodiment, a portion of the flexible display (or flexible keyboard) may be utilized when the flexible display (or flexible keyboard) is stored in said first housing.

13 Claims, 19 Drawing Sheets

Related U.S. Application Data continuation of application No. 12/324,883, filed on Nov. 27, 2008, now Pat. No. 8,644,010, which is a continuation of application No. 11/208,943, filed on Aug. 22, 2005, now Pat. No. 7,667,962.

(60) Provisional application No. 60/603,481, filed on Aug. 20, 2004, provisional application No. 60/628,475, filed on Nov. 16, 2004.

(51) Int. Cl.

| | | |
|---|---|---|
| *H05K 7/00* | (2006.01) | |
| *G09G 5/00* | (2006.01) | |
| *G06F 3/01* | (2006.01) | |
| *G06F 1/16* | (2006.01) | |
| *G02B 27/01* | (2006.01) | |
| *G06T 19/00* | (2011.01) | |
| *G09F 9/30* | (2006.01) | |
| *H04M 1/23* | (2006.01) | |
| *H04M 1/05* | (2006.01) | |
| *H04M 1/02* | (2006.01) | |
| *H01H 13/86* | (2006.01) | |
| *G06F 3/045* | (2006.01) | |
| *G06F 3/0354* | (2013.01) | |
| *G06F 3/02* | (2006.01) | |
| *H04M 1/60* | (2006.01) | |

(52) U.S. Cl.
CPC ............... *H04M 1/05* (2013.01); *H04M 1/23* (2013.01); *H01H 2223/052* (2013.01); *H04M 1/6041* (2013.01); *H04M 2250/16* (2013.01); *H04M 2250/18* (2013.01)

(56) References Cited

U.S. PATENT DOCUMENTS

| | | | |
|---|---|---|---|
| 5,815,126 A * | 9/1998 | Fan | G02B 27/017 345/7 |
| 5,986,813 A | 11/1999 | Saikawa | |
| 6,229,514 B1 | 5/2001 | Larson | |
| 6,311,076 B1 | 10/2001 | Peuhu et al. | |
| 6,356,437 B1 * | 3/2002 | Mitchell | G06F 1/163 342/352 |
| 6,369,952 B1 * | 4/2002 | Rallison | G02B 27/017 359/630 |
| 6,643,124 B1 | 11/2003 | Wilk | |
| 6,771,232 B2 | 8/2004 | Fujieda et al. | |
| 6,801,855 B1 | 10/2004 | Walters et al. | |
| 7,050,835 B2 | 5/2006 | Hack et al. | |
| 7,180,665 B2 | 2/2007 | Daniel et al. | |
| 7,184,086 B2 | 2/2007 | Tamura | |
| 7,187,363 B2 | 3/2007 | Nguyen et al. | |
| 2001/0003450 A1 | 6/2001 | Hemia et al. | |
| 2001/0034249 A1 | 10/2001 | Peuhu et al. | |
| 2002/0090980 A1 | 7/2002 | Wilcox et al. | |
| 2003/0048256 A1 | 3/2003 | Dowling et al. | |
| 2003/0109286 A1 | 6/2003 | Hack et al. | |
| 2003/0144034 A1 | 7/2003 | Hack et al. | |
| 2004/0061683 A1 | 4/2004 | Mochizuki et al. | |
| 2006/0034039 A1 | 2/2006 | Van Reps | |
| 2006/0061555 A1 | 3/2006 | Mullen | |
| 2006/0146488 A1 | 7/2006 | Kimmel | |
| 2006/0194619 A1 | 8/2006 | Wilcox et al. | |
| 2006/0209218 A1 | 9/2006 | Lee et al. | |

* cited by examiner

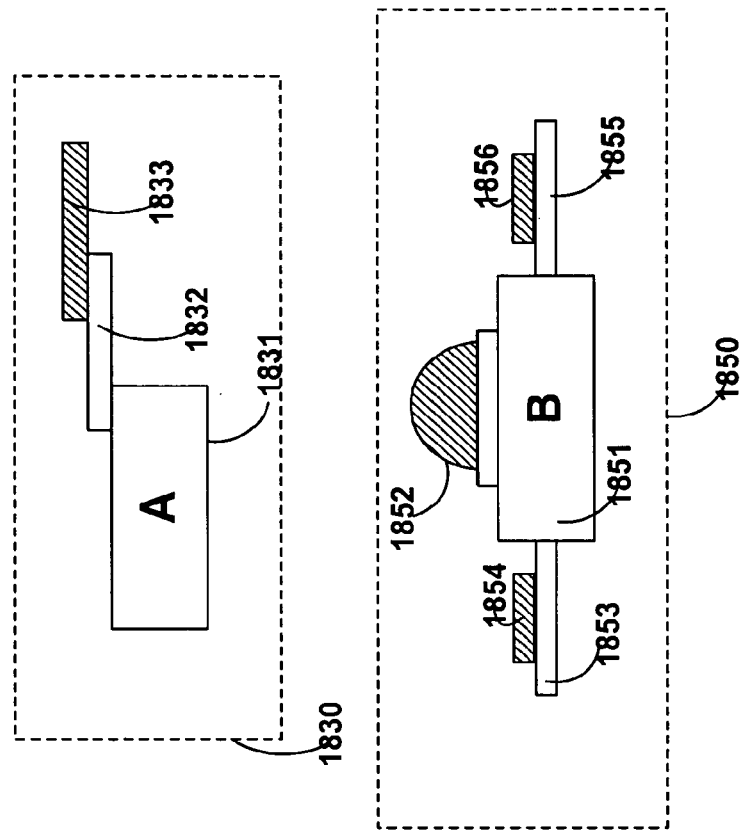
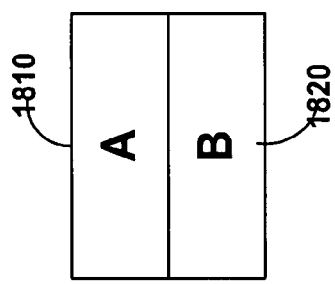
FIG. 18

WIRELESS DEVICES WITH FLEXIBLE MONITORS AND KEYBOARDS

CROSS-REFERENCE TO RELATED APPLICATION

This application is a continuation of Ser. No. 14/171,748, which is a continuation of U.S. patent application Ser. No. 12/324,883, which is a continuation of U.S. patent application Ser. No. 11/208,943, which claims the benefit of U.S. Provisional Patent Application No. 60/603,481 filed on Aug. 20, 2004 and entitled "Wireless Devices With Flexible Monitors and Keyboards," which is hereby incorporated by reference herein in its entirety.

U.S. patent application Ser. No. 11/208,943 also claims the benefit of U.S. Provisional Patent Application No. 60/628,475 filed on Nov. 16, 2004 and entitled "Location-Based Games and Augmented Reality Systems," which is hereby incorporated by reference herein in its entirety.

BACKGROUND OF THE INVENTION

This invention relates to improved portable devices. More particularly, this invention relates to portable devices with enlarged, and improved, display and input components.

Traditional portable devices are deficient. Even though it is desirous to fabricate portable devices as small as possible, it is also desirous to maximize the size of input components (e.g., keyboards) and output components (e.g., display components). Traditionally, the size of a device's input and display components are limited by the dimensions of the device's housing. It is therefore desirable for improved portable devices (e.g., wireless devices) with input and output components that are larger than the housing of the portable device itself.

Numerous entities have fabricated flexible displays (i.e., displays that can bend) and touch-sensitive flexible displays.

SUMMARY OF THE INVENTION

It is an object of the present invention to include flexible display screens in portable devices.

It is also an object of the present invention to include flexible input components (e.g., keyboards or touch-sensitive flexible display screens) into portable devices.

An improved portable device is provided that includes both a flexible display screen and a flexible keyboard. Such flexible components may be, for example, rolled, folded, or flexed into a portion of the housing of the portable device. In this manner, such flexible components may be extendable from, and retract back into, a device's housing. In some embodiments a device's housing includes two or more housings that are coupled together (e.g., coupled together by a flexible input or output component). Instead of a flexible keyboard, a touch-sensitive flexible display screen may be provided with a flexible display screen. As touch-sensitive flexible display screens are more costly, and power consuming, than flexible display screens that are not touch sensitive, the use of multiple types of display screens reduces cost and conserves power. Alternatively, a wireless device can be provided with only one extendable input/component—such as only an extendable keyboard {e.g., a flexible keyboard), a display (e.g., a flexible display, or a touch-sensitive display (e.g., a flexible touch-sensitive display).

Support structures can also be provided that provide structural support to flexible structures (e.g., flexible displays or keyboards) when those structural components are extended (or partially extended).

For head-mounted devices with flexible output devices (e.g., display screens), an input glove is provided. Such an input glove allows for a wide number of inputs that can equal, and in some cases surpass, the number of inputs on a keyboard. In this manner, a user may pull a small device from his/her pocket, extend the display monitor, detach an input glove from the device, put on the input glove, extend a display screen and mount the device/screen to his/her head, and utilize the device while, for example, walking.

Non-flexible extendable displays and input devices can also be provided. For example, a head mounted device can have a non-flexible display. Thus, a user can support a device on one of his/her ears and extend a non-flexible display over just the eye closest to the hear supporting the device. A detachable/mateable input device may be separated from such a head mounted device so that a user can hold this input device in his hand to provide control information to the portable device through a wireless, or wire-based communications channel (e.g., Bluetooth, infrared, or radio). Such a detachable/mateable device can include extendable non-flexible input components.

A number of systems and methods for displaying information to a user of a portable device is also provided. For example, virtual bifocals are provided in head-mounted systems such that a user can work in a virtual world (e.g., check email from an email server or surf the internet on a browser) while working in an actual world (e.g., while walking to work in the morning). Such a virtual bifocal can also be used to provide to versions of the same data. For example, if a night-vision camera and/or an infrared camera is provided on a head-mounted device (or remotely). This information can be displayed on all, or a portion of a display (e.g., by using input controls).

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 18 is an illustration of a device constructed in accordance with the principles of the present invention.

DETAILED DESCRIPTION OF THE INVENTION

U.S. patent application Ser. No. 10/400,296 filed on Mar. 25, 2003 entitled "Systems and Methods for Locating Cellular Phones and Security Measures for the Same" is hereby incorporated by reference herein in its entirety.

U.S. patent application Ser. No. 10/785,289 filed on Feb. 24, 2004 and entitled "Maximizing Power Generation in and Distributing Force Amongst Piezoelectric Generators" is hereby incorporated by reference herein in its entirety.

U.S. patent application Ser. No. 10/797,801 filed on Mar. 9, 2004 entitled "Systems and Methods for Providing Remote Incoming Call Notification for Cellular Phones" is hereby incorporated by reference herein in its entirety.

U.S. patent application Ser. No. 10/932,536 filed on Sep. 1, 2004 entitled "Systems and Methods for Location Based Games and Employment of the Same on Location Enabled Devices" is hereby incorporated by reference herein in its entirety.

Figure 1:
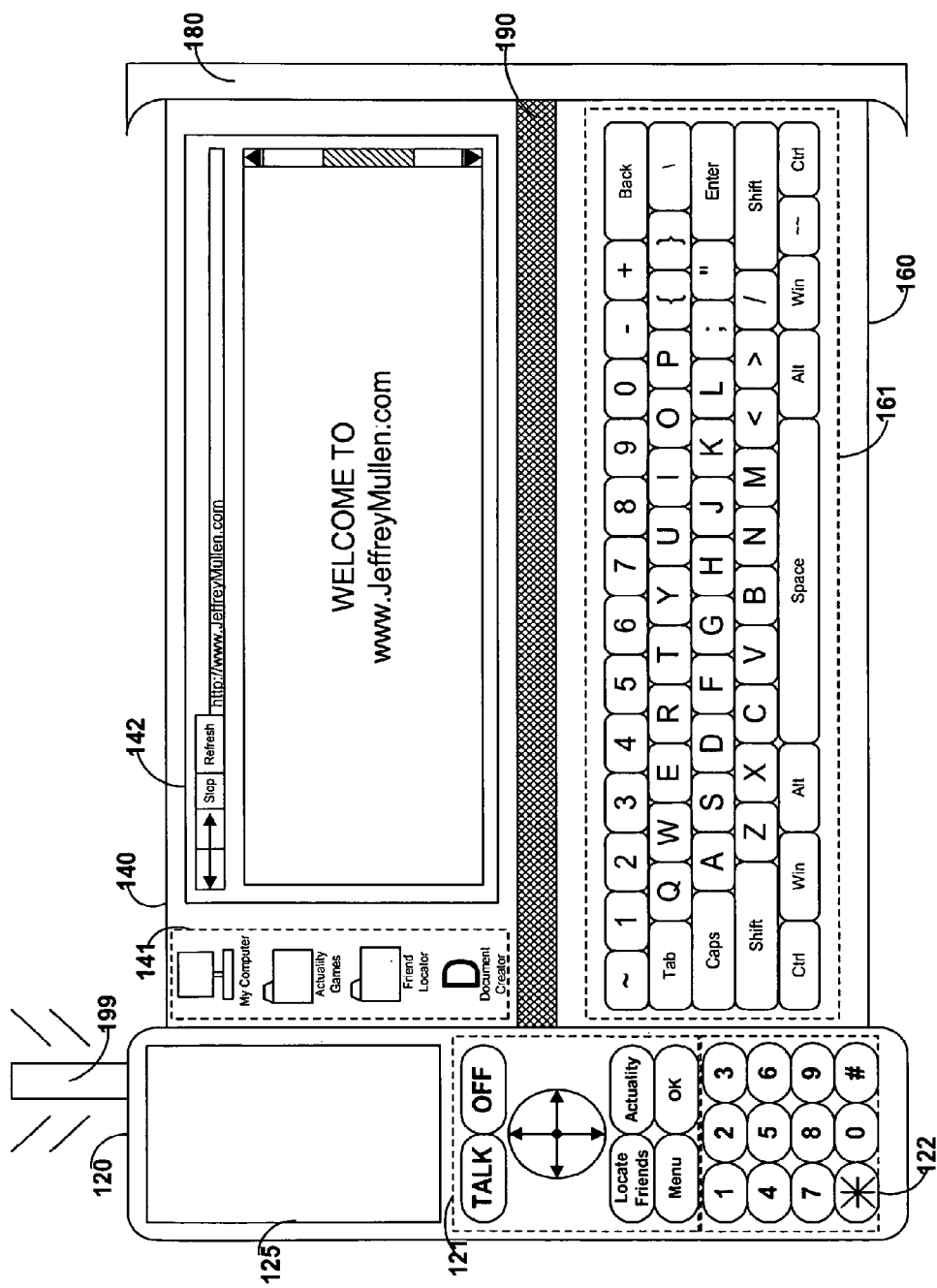
FIG. 1 is an illustration of a portable device with a flexible display component and a flexible input component constructed in accordance with the principles of the present invention.

FIG. 1 shows portable device 100. Portable device 100 may be, for example, any type of wireless or handheld device. Such wireless and handheld devices may include, for example, wireless telephones (e.g., CDMA, TDMA, cellular, GSM, or PCS wireless telephones), wireless Personal Digital Assistants (PDAs), portable video game systems, portable augmented reality systems, portable virtual reality systems, laptops, and portable media players such as portable audio and video players.

Persons skilled in the art will appreciate that components of portable device 100 may be utilized with non-portable devices. For example, flexible displays and keyboards may be integrated into, and extendable from, portions of a car. Thus, a passenger in the back seat can extend a flexible display from the ceiling or the back of a seat when that passenger wants to, for example, watch a movie. Similarly flexible input components, such as keyboards, can extend from the dash. As such, the dash may provide support for the flexible input components.

Portable device 100 may include flexible display 140 and flexible keyboard 160 that extend from housing 120. Housing 120 may include memory, processing circuitry, and a power source utilized by flexible keyboard 160 and flexible display 140 (and the other components of portable device 100).

At least a portion of flexible display 140 may be extendible from, and retractable back into, housing 120. Grip 180 may be utilizes to pull flexible display 140 from housing 120. Grip 180 may also be used as a stop so when flexible display 140 cannot be retracted past stop 180. Flexible display 140 may be automatically retracted via, for example, a switch (not shown), or manually retracted (e.g., manually wound over an axle or manually folded/placed into housing 120).

Display 125 may be included in device 100 as stationary/non-flexible display that is visible from the exterior of housing 120. In this manner, portable device 100 may be utilized without the need to extend/extract flexible display 140. Alternatively, display 125 may be an aperture in housing 120 such that at least a portion of a retracted flexible display 140 is visible via the aperture. For example, flexible display 140 may be rolled around an axle located in housing 120. In this manner, flexible display 140 may be configured such that the side facing a portion of housing 120 is displayable even when flexible display is housed in housing 120. Persons skilled in the art will appreciate that only a portion of a retracted flexible display may desired to be ON to fill an amount of an aperture in housing 120. In this manner, to save power, only a portion of flexible display 140 may be operable to be turned ON (or selected to turn ON) when flexible display 140 is retracted into housing 120.

Flexible input 160 may be utilized as, for example, a computer display/monitor. In this manner, a user may, for example, interact with the various input devices on portable device 100 to change the images displayed on flexible display 140. Portable device 140 may include any number or type of hardware and software. For example, antenna 199 may be included such that portable device 100 is provided with a wireless communications capability. In this manner, flexible display screen may, for example, display video from a telephonic video conference or a web browser 142. Similarly, portable device 100 may have a computing capability. In such instances where computing is desired, a user may utilize computing tools 141. Device 100 may include, for example, software and hardware to play video, play audio, provide video games, wirelessly or non-wirelessly communicate, surf the internet {or an intranet), augment reality, and provide location based services.

At least a portion of flexible input 160 may be extended from, and retracted back into, housing 120. Flexible input 160 may be coupled to grip 180 in order to facilitate, for example, the removal of flexible input 160 from housing 160. Grip 180 may be, for example, fabricated from a non-flexible material, such as the material used to fabricate housing 120.

Stationary inputs 122 may be provided on housing 120 and may be utilized from the external surface of housing 120 when, for example, flexible input 160 is retracted into housing 120. Similarly, stationary inputs 122 may be utilized in conjunction with an extendable input or output component. Similar to display 125, input 122 may be an aperture in which at least a portion of flexible input 160 may be utilized when at least a portion of flexible input 160 resides in housing 120. Persons skilled in the art will appreciate that a portion of flexible input 160 may reside in housing 120 even when flexible input 160 is fully extended. In this manner, flexible input 160 may be utilized both through an aperture defined by input 122 and outside of housing 120 simultaneously.

Flexible input 160 may, for example, include keyboard 161. Keyboard 161 may be modeled after a standard keyboard. Alternatively, only portions of a standard keyboard may be provided as flexible input 160. A keyboard is generally a set of manually controls. In this manner, any type of control may be embodied as flexible keyboard 161. For example, a telephonic keypad (similar to the one illustrated in display 122) or another keyboard (similar to controls 121) may be embodied as keyboard 161.

Controls 121 may be provided as external controls for device 100 or as flexible controls on flexible input 160. Controls 121 may include, for example, device specific controls. For example, controls 121 may include phone controls such as TALK and CLEAR. Controls 121 may also provide directional controls and ON/OFF controls. Furthermore, program specific controls (which may also be device specific controls) may be included. In this manner, a LOCATE FRIENDS control or an ACTUALITY control may be included. For example, if a user desires to play a location-based or augmented reality game, the ACTUALITY button may be utilized. If a user desires to locate friend's devices (e.g., additional devices 100), LOCATE FRIENDS control may be utilized.

Flexible display 140 and flexible input 160 may be coupled together. For example, flexible display 140 and flexible input 160 may be coupled to the same grip 180 and or attached via structure 190. Structure 190 may be, for example, a tape. Alternatively structure 190 may be a polymer glued on at least a portion of a surface of flexible input 160 and flexible display 140. Alternatively, flexible input 160 and flexible display 140 may not be coupled together. For example, flexible input 160 and flexible display 140 may extend separately and have separate grips. Persons skilled in the art will appreciate that grips only facilitate particular functions and need not be included in portable device 100. Persons skilled in the art will appreciate also that portable device 100 may be provided without a flexible input (or a flexible display).

Figure 2:
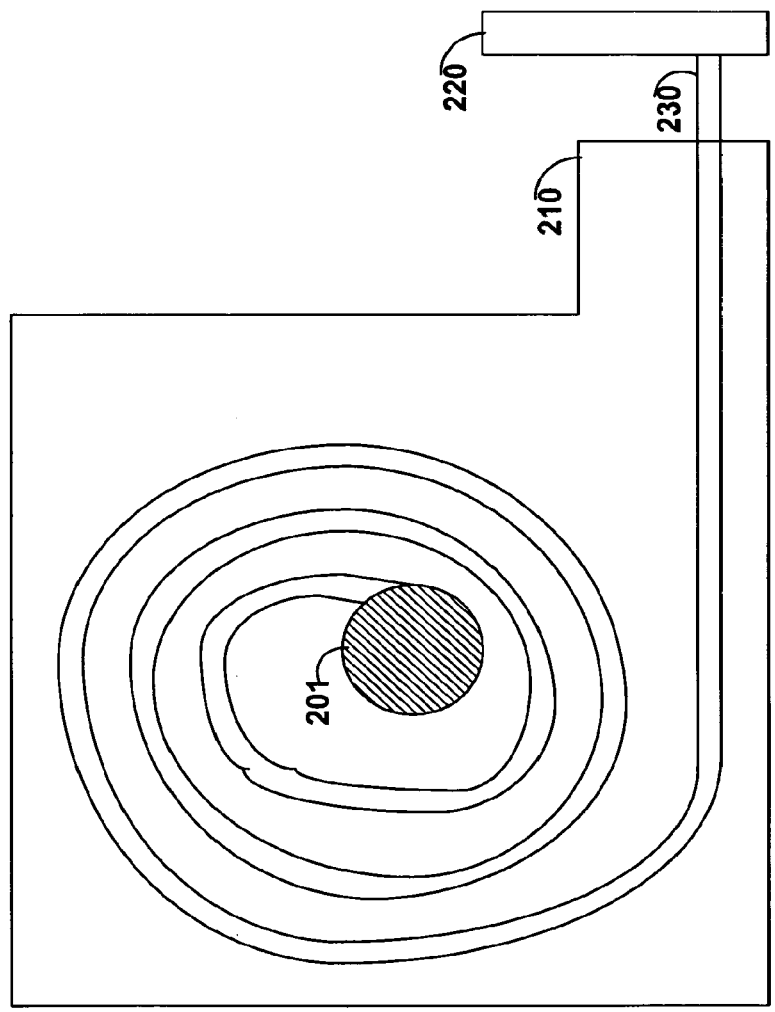
FIG. 2 is an illustration showing the interior of a portable device constructed in accordance with the principles of the present invention.

FIG. 2 shows portable device 200 that includes one or more flexible components 230 attached to one or more grips 220. Flexible components 230 may be extended from housing 210 by pulling grip 220. For example, flexible components 230 may be wound around axle 201 when in a retracted, or partially retracted, position. Grip 220 may be utilized to aid in extending flexible components 230 from housing 210 (e.g., may provide a better grip then the flexible components). Grip 220 may also, for example, act as a stop such that 230 can only retract into housing 210 to a particular degree.

Axle 201 may be coupled to, for example, a spiral spring grounded to housing 210 (not shown) such that when flexible components 230 are at least partially retracted, a retracting force is applied against the extended portion of flexible components 230. In this manner, flexible components 230 may be provided with an autonomous retracting functionality. A mechanical stop (not shown) may be provided such that a user may mechanically put a force against axle 201, or flexible components 230, to fight the retracting force (while the stop is activated). In this manner, flexible components 230 may be extended a particular distance and then stopped, via a mechanical stop. The user may then let go of device 100 entirely and not worry about flexible components 230 retracting. Such a stop may be de-activated such that retracting may occur. Further, axle 201 may be wound manually by, for example, a lever (not shown).

Grip 220 may alternatively act as supplemental housing. For example, grip 220 may be large enough to house a second axle that flexible components 230 {or other flexible components) may extend and retract from.

Persons skilled in the art will appreciate that axle 201 need not be included in housing 210. Rather a portion of housing 210 may open up such that flexible components may be folded or stuffed into housing 210. For example, a housing portion may act as a door that is hinged on housing 210. Similarly, the aperture in housing 210 that receives components 230 may be enlarged to the size of, for example, grip 220 such that grip 220 mates (e.g., snaps) with the portion of the housing defining the aperture when components 230 are stored in housing 210.

Figure 3:
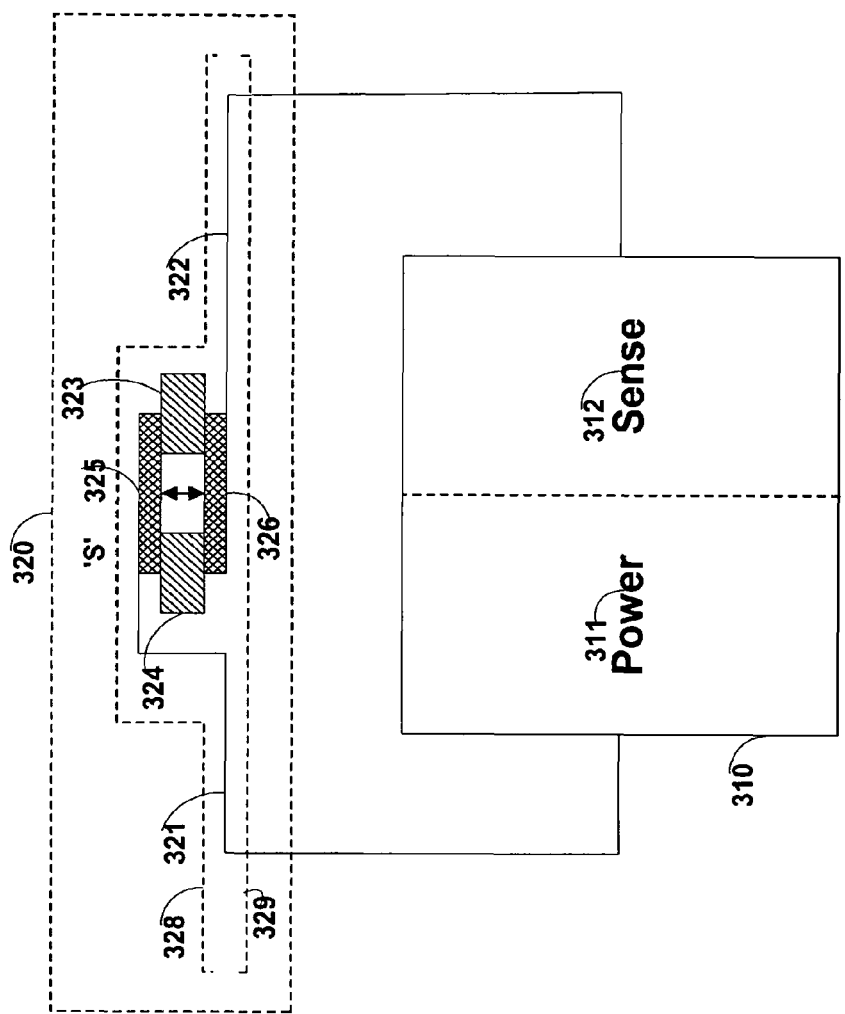
FIG. 3 is an illustration of a flexible input component, and related components, constructed in accordance with the principles of the present invention.

FIG. 3 shows one embodiment of a flexible input component. Particularly, FIG. 3 shows flexible input 300 that may include any number of flexible controls 320 coupled to processor 310. Flexible control 320 may include conductive layers 325 and 326 separated by non-conductive layers 324 and 323. Conductive layers 325 and 326 may be fabricated from a flexible conductive materials or may be non-flexible. Accordingly, conductive layers 325 and 326 may form an input control and such input controls can be spaced such that even if portions of the input controls are non-flexible, the input component as a whole is flexible.

Furthermore, flexible non-conductive components 324 and 323 may be a single component such as, for example, a non-conductive washer-shape cushion. In this manner, non-conductive components 324 and 323 may form a ring such that when, for example, a downward force is applied to conductive layer 325 the ring may compress and conductive layer 325 may electrically couple layer 326. In this manner, an electromechanical switch may be provided. For example, an electrical signal may be provided by processor 310 (e.g., power process 311 via node 311) to conductive layer 325 such that when conductive layer 325 electrically coupled conductive layer 326, processor 310 may sense the provided electrical signal (e.g., sense process 312 via node 322).

Multiple such electromechanical switches may be provided and coupled together by one or more flexible layers 328 and 329 such that a flexible keyboard is provided. Persons skilled in the art will appreciate that a flexible keyboard does not necessarily have to include all of the controls of a traditional keyboard. Instead, a flexible keyboard can be any type of key-pad that contains any number and any type of input control. Portions of particular components may be fixed (e.g., glued) to particular portions of flexible layers 328 and 329 such that the electromechanical switches remain in the same position (with respect to layers 328 and 329) when electromechanical switch is in an extended or retracted position. Flexible layers 328 and 329 may be, for example, a transparent polymer.

Persons skilled in the art will appreciate that a flexible input device may take multiple forms. For example, conductive layer 326 may be included as two separate and isolated layers. When conductive layer 326 electrically contacts these two separate and isolated layers, conductive layer 326 may electrically couple these two separate layers together. In this manner, conductive layer 325 may be provided as a relay between the two separated portions of layers 326. An electrical signal may be provided to a particular one of these two separated portions, and sensed by the other separate portion, when the relay is ON such that a manual input is realized. Processor 310 may associate a particular action to a particular flexible electromechanical switch (e.g., via software stored in memory or hard-coded into circuitry) such that a variety of controls may be provided. For example, electromechanical switch 320 may be associated to the letter "S."

Persons skilled in the art will appreciate that numerous types of flexible input devices may be provided in accordance with the principles of the present invention. For example, piezoelectric components can be utilized as a flexible input device. For example, pieces of piezoceramic may each be sandwiched between conductive layers. Each piezoceramic (or other touch sensing structure) may be aligned with indicia representative of a particular type of control (e.g., indicia on layer 320 such as ENTER or CTRL). When a user touches the portion of layer 320 having indicia on it (e.g., ENTER), the piezoceramic may be compressed or bent (or a electromechanical switch may be activated) such that control signals are provided to a processor to perform a function associated to the pressed indicia (i.e., an ENTER function may be performed). A piezoelectric generator may be configured to produce a voltage whenever the piezoelectric is bent or whenever the piezoelectric is compressed.

Air holes {not shown) may also be included in order to aid in the autonomous decompression of a flexible cushion {if utilized) when a force is not applied compressing the cushion. Such a cushion may have a spring constant sufficient to, for example, decouple conductive layers {e.g., decouple layer 325 from layer 326) as soon as the input control associated to the conductive layers is depressed.

Figure 4:
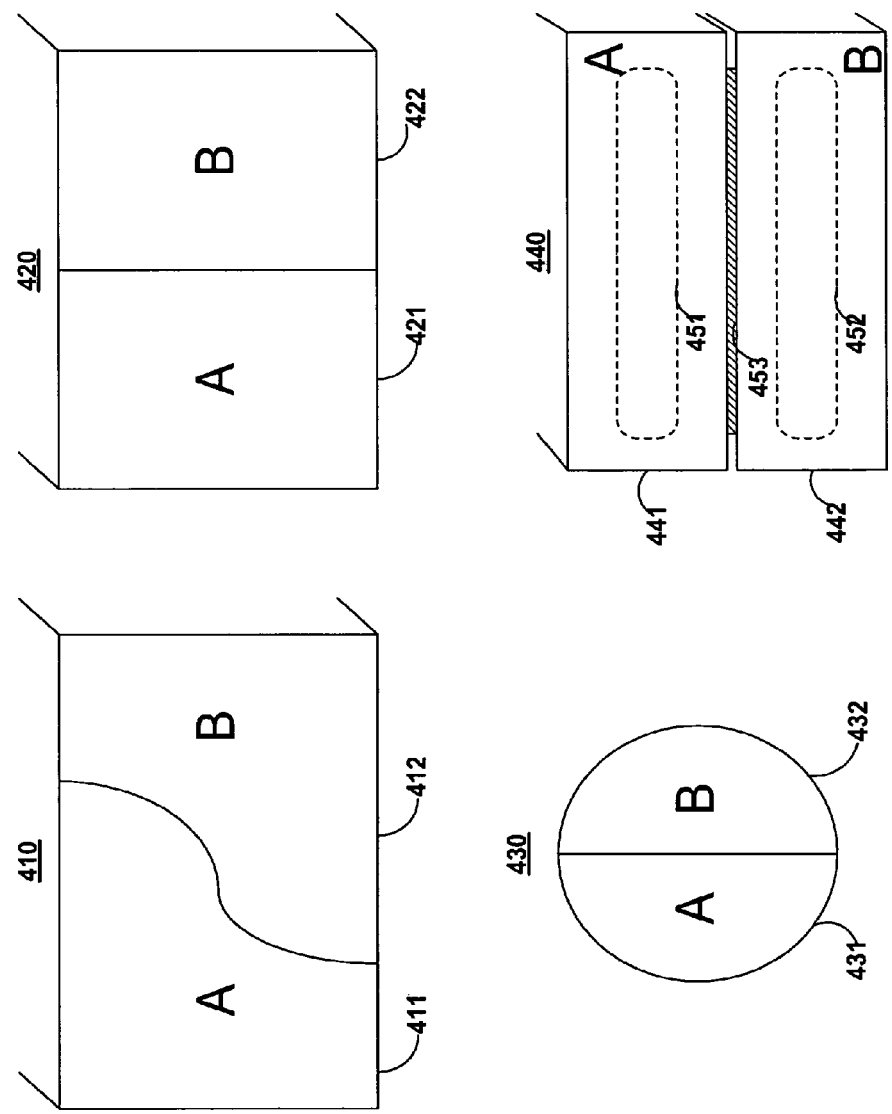
FIG. 4 are illustrations of portable device housing configurations constructed in accordance with the principles of the present invention.

FIG. 4 show a variety of possible housings. Particularly, FIG. 4 shows housings 410, 420, 430, and 440.

Housing 410 includes housing portions 411 and 412. One or both of housing portion 411 and 412 may include, for example, an axle that flexible components {or the same flexible component) may be retractable into. For example, a flexible display may have one end coupled to an axle in housing 411 and another end coupled to and axle in housing 422. Female and male curvatures may exist between the two devices such that more stability is provided to housing 410 when housing 411 and 412 are physically connected together.

Housing 420 may include housing portions 421 and 422. No substantial male female connection is provided through the general structure of housing 420. In this manner, housing components 421 and 422 may be more able to, for example, roll more of a flexible component around an axle.

Housing 430 is provided and includes housing portions 431 and 432. Housing 430 may by cylindrical in shape.

Housing 440 is provided and include housing portions 441 and 442. Axles 451 and 452 may be provided in portions 441 and 442, respectively such that one or more flexible components 453 may be extended from, and retracted back into housing portions 441 and 442, respectively.

Figure 5:
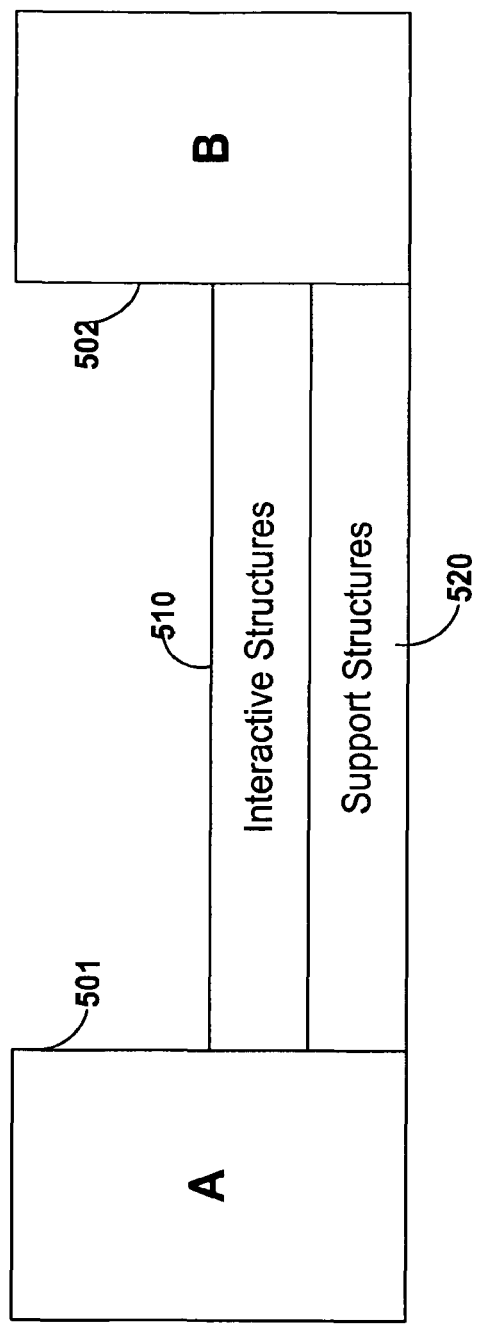
FIG. 5 is an illustration of a portable device in an expanded configuration constructed in accordance with the principles of the present invention.

FIG. 5 shows a portable device 500 with an expanded flexible interactive structure 510 (e.g., a flexible display or flexible input). Support structure 520 is provided such that flexible structure 510 becomes inflexible. In this manner, structural stability may be provided throughout housing 501, flexible interactive structure 510 and housing 502. For example, flexible interactive structure 510 may be extended from one, or both, housing portions 501 and/or 502 such that a sturdy tablet PC is provided. In this manner, the present invention may combine multiple types of devices into a single ultimate electrical device—a personal electronic device (PED). In this manner, a PED could be, for example, a cellular phone when compacted (e.g., flexible components are retracted) and a sturdy, wireless tablet PC when expanded.

Figure 6:
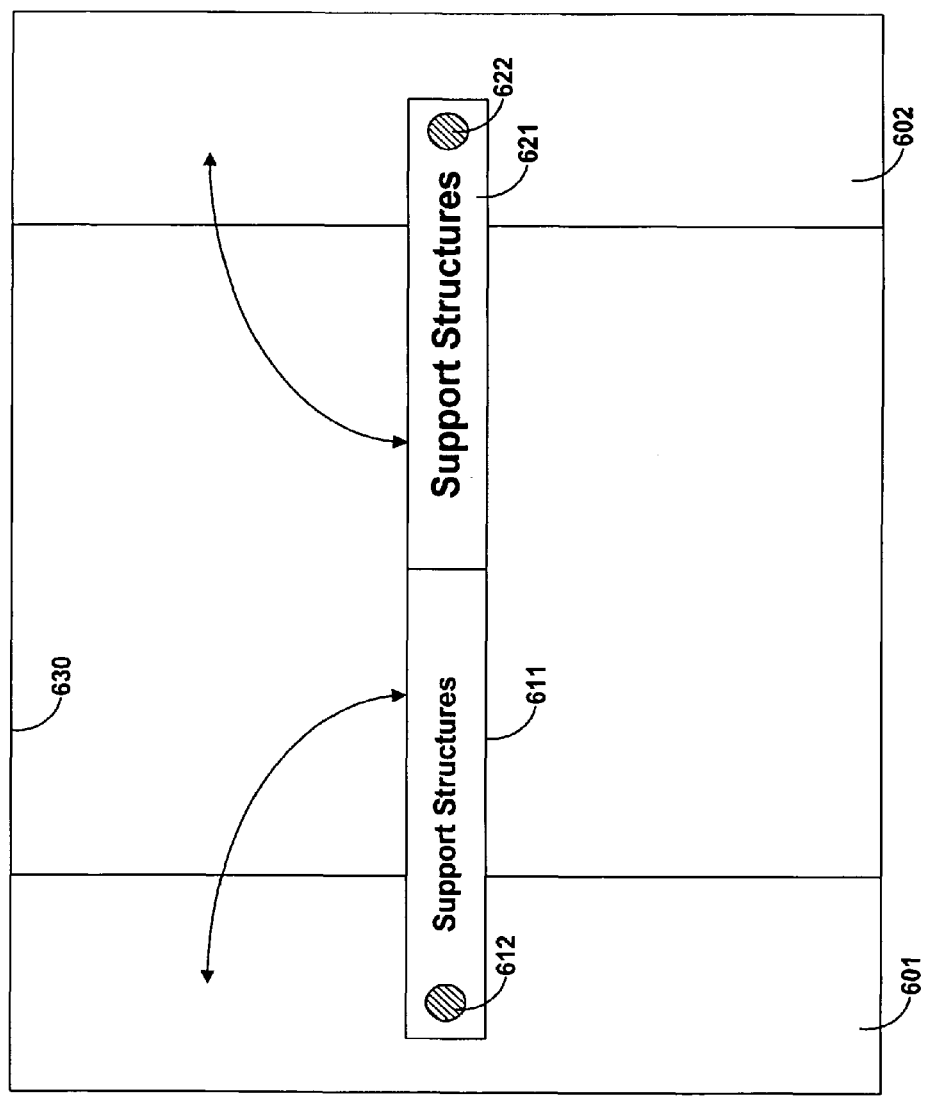
FIG. 6 is an illustration of another portable device in an expanded configuration constructed in accordance with the principles of the present invention.

FIG. 6 shows device 600 that may include support structures 611 and 621 that pivot around axles 612 and 622, respectively. Such axles may be locked, or support structures may be connected and locked together) to increase the structural stability of the expanded device. Any number of such support structures may be provided on either housing 601 or housing 602 to provide support to flexible interactive component 630 (e.g., a flexible display, flexible input, or both)

Figure 7:
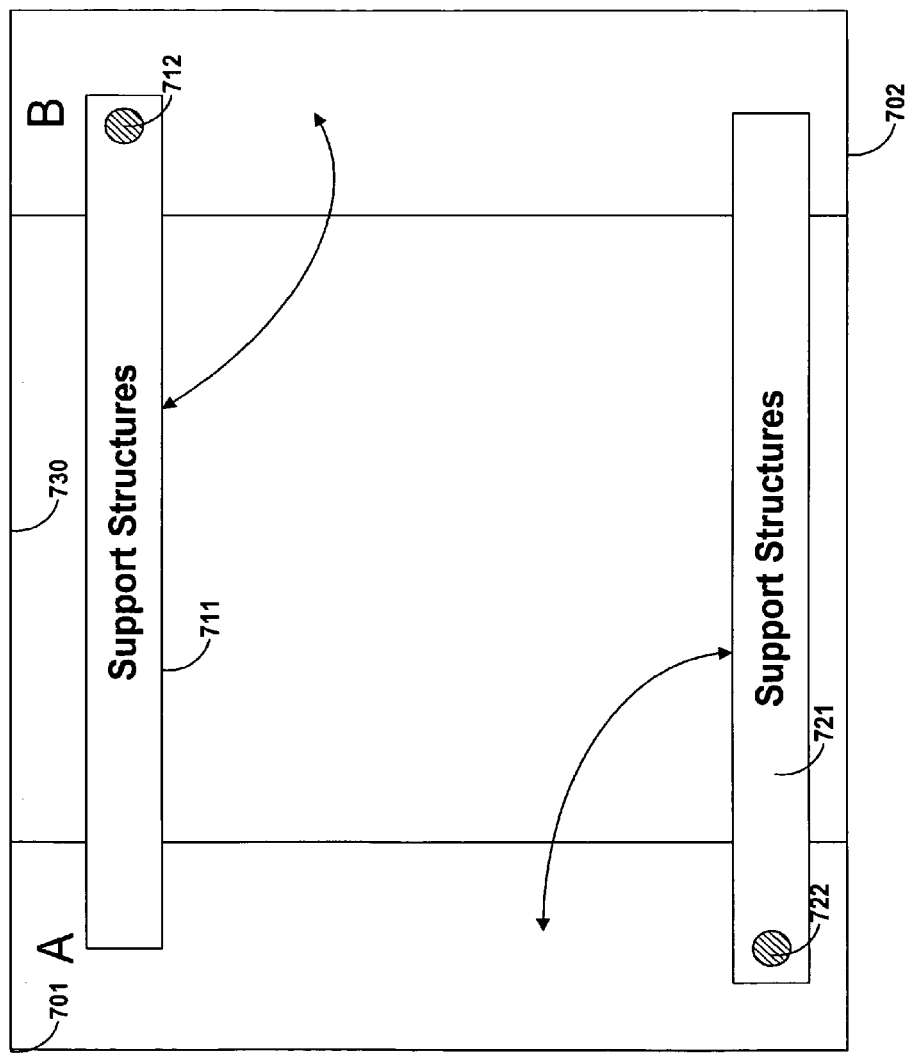
FIG. 7 is an illustration of a portable device in another expanded configuration constructed in accordance with the principles of the present invention.

FIG. 7 shows device 700 that may include support structures 711 and 721 that may pivot about structures 712 and 722, respectively, on one or more housing portions 701 and 702, respectively, to support flexible components 730. Persons skilled in the art will appreciate that device 700 is particularly beneficial if only a single housing portion is provided. For example, suppose both structure 711 and structure 722 pivot on housing portion 701. Structures 711 and 722 may be spaced such that they do not extend outside of the boundary defined by housing portion 701 when retracted. When structures 711 and 722 are extended however, structural stability may be provided to flexible components 730. Flexible components 730 may, for example, fix directly to one or more structural components. For example, the end of an extended flexible components 730 may contain a latch for each of structural components 711 and 721 so that flexible components 730 may be temporarily attached to structural components 711 and 721.

Figure 8:
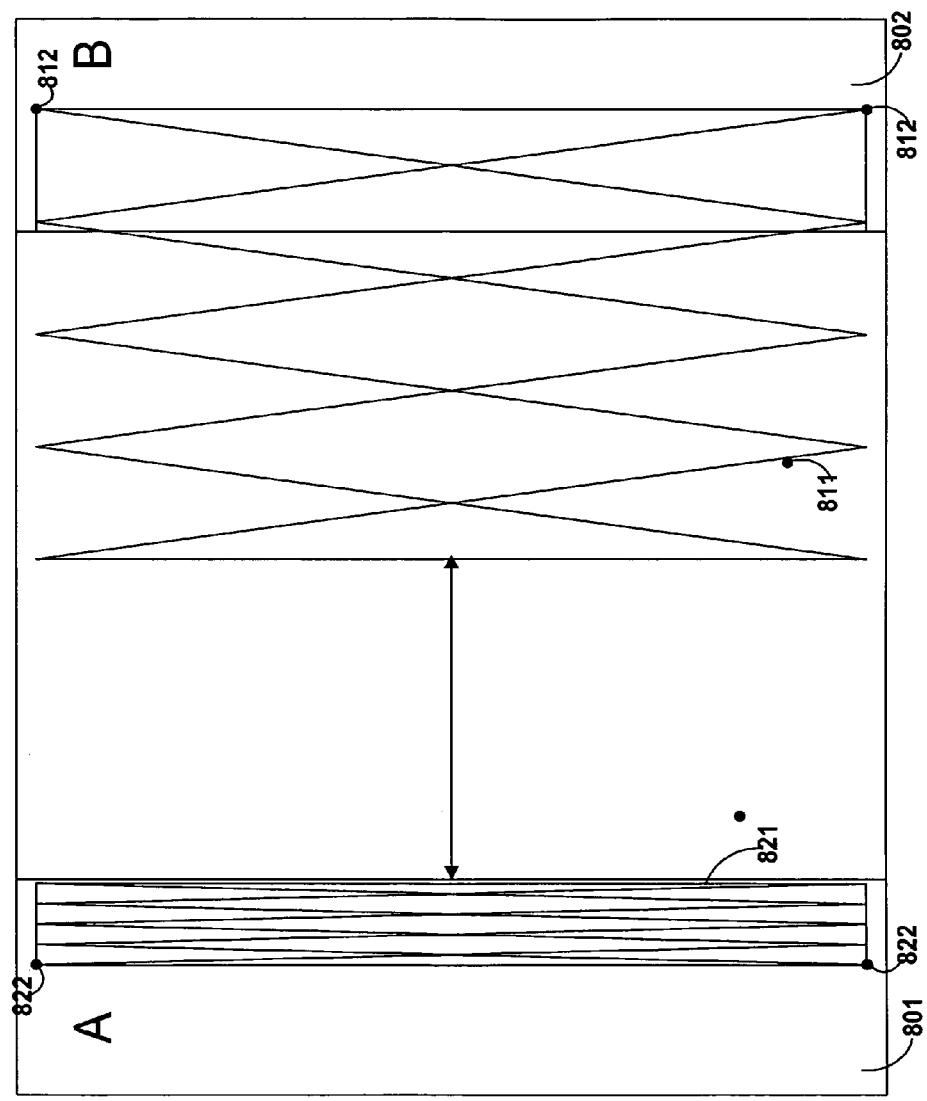
FIG. 8 is an illustration of a portable device in a partially expanded configuration constructed in accordance with the principles of the present invention.

FIG. 8 shows device 800 that may be provided with one or more housing portions 801 and 802 and one or more accordion structures 811 and 821 permanently affixed at points 812 and 822, respectively.

Figure 9:
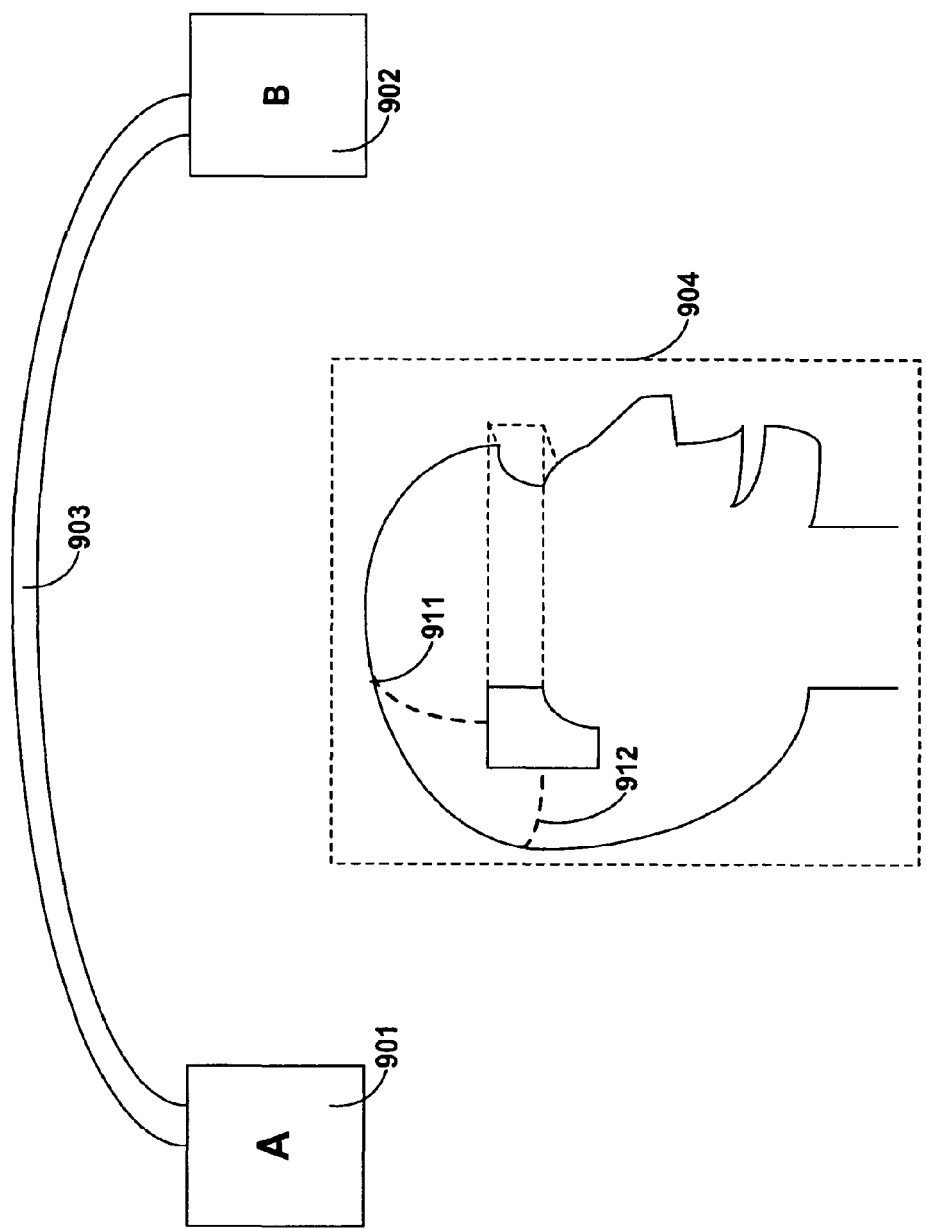
FIG. 9 is an illustration of a portable device configured as a headset in an expanded configuration constructed in accordance with the principles of the present invention.

FIG. 9 shows portable device 900 that may act as a headset as shown in illustration 904. One or more housing portions may be utilized. For example housing portions 901 and 902 may be utilized to house flexible components 903. Such housing portions 901 and 902 may also act as ear pieces. A curved support structure may also be provided. For example, a curved support structure may be curved like a portion of a frame of a sunglass such that the flexible display curves around (or into} the support. Persons skilled in the art will appreciate that only a portion of a flexible component may desire a flexible display or a flexible input. For example only the portions of flexible component 903 that would be in front of one eye may be desired to be a monitor. In such instances, the rest of flexible component 903 may be, for example, a transparent polymer.

Head mounting structures may also be provided. For example, if two device housings are utilized (e.g., housing 901 and 902} than a head mounting structure may be extendable from both. Such a head mounting structure of one of the housings may be mateable with the head mounting structure of the other one of the housings. When mated, the two head mounting structures can be used to form top-of-the-head mounting structure 911 or back-of-the-head mounting structure 912 or both. Persons skilled in the art will appreciate that an entire top-of-the-head mounting structure or -back-of-the-head mounting structure may be extendable from just one housing (e.g., housing 901} stored in an area of just one housing, or irremovably attached or permanently fixed to an area of just one housing.

Figure 10:
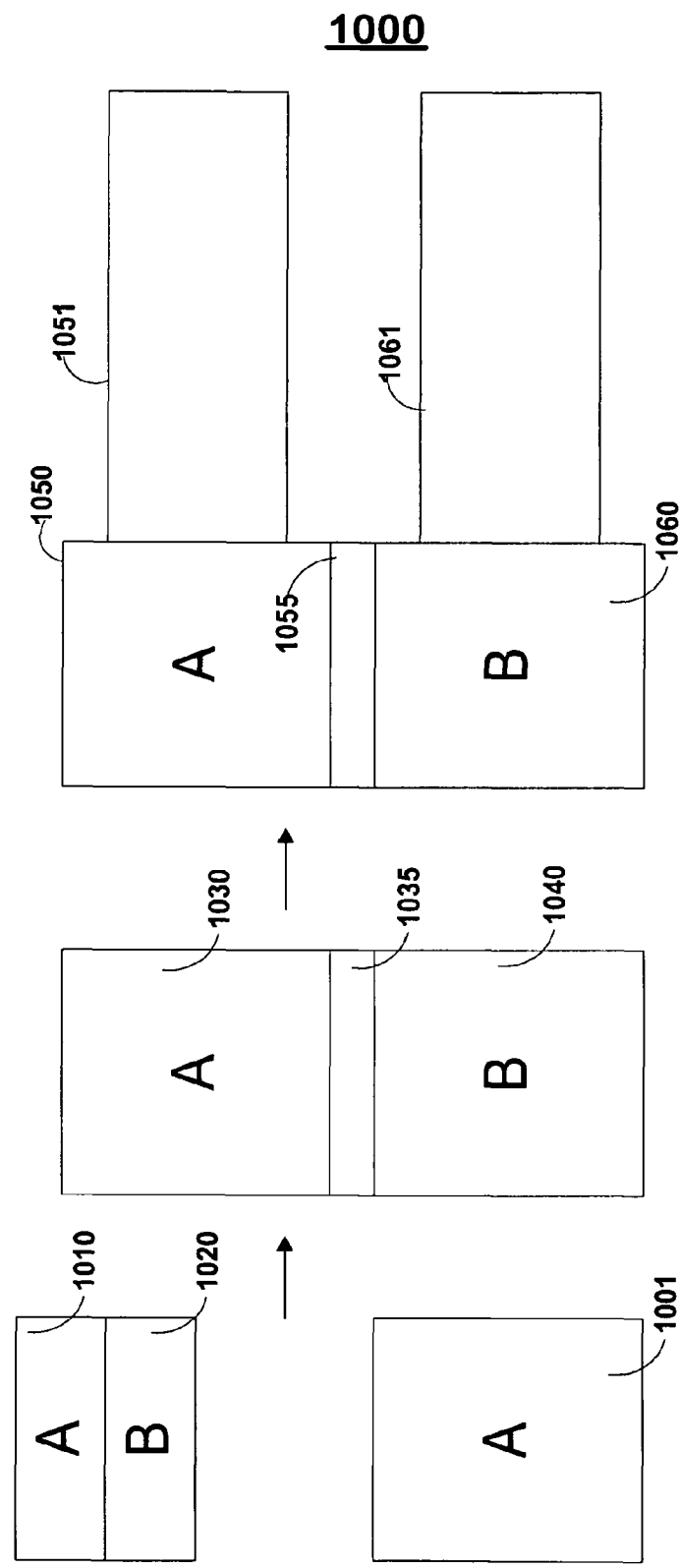
FIG. 10 is an illustration of an expanding process constructed in accordance with the principles of the present invention.

FIG. 10 shows device 1000 that is foldable (e.g., can be flipped open and closed). In this manner device 1000 may be provided as a wireless phone or a miniature laptop with enhanced attributes. Device 1000 may be include housing portions 1010 and 1020 that may be folded into one surface area 1001. Hinge 1035 (which may include components such as electrical circuitry) may be provided to allow housing portions 1010 and 1029 to OPEN and CLOSE into surface area 1001 (shown as portions 1030 and 1040). Each housing portion may include one or more flexible components. For example, one housing component may include a flexible display (e.g., housing component 1050 on hinge 1055 may include flexible display 1051). Furthering this example, a different housing component (e.g., housing component 1060 on hinge 1055 may include flexible input device 1061). Persons skilled in the art will appreciate that support structures may also be provided to provide structural support to flexible components when those flexible components are extended from the housing portions.

Figure 11:
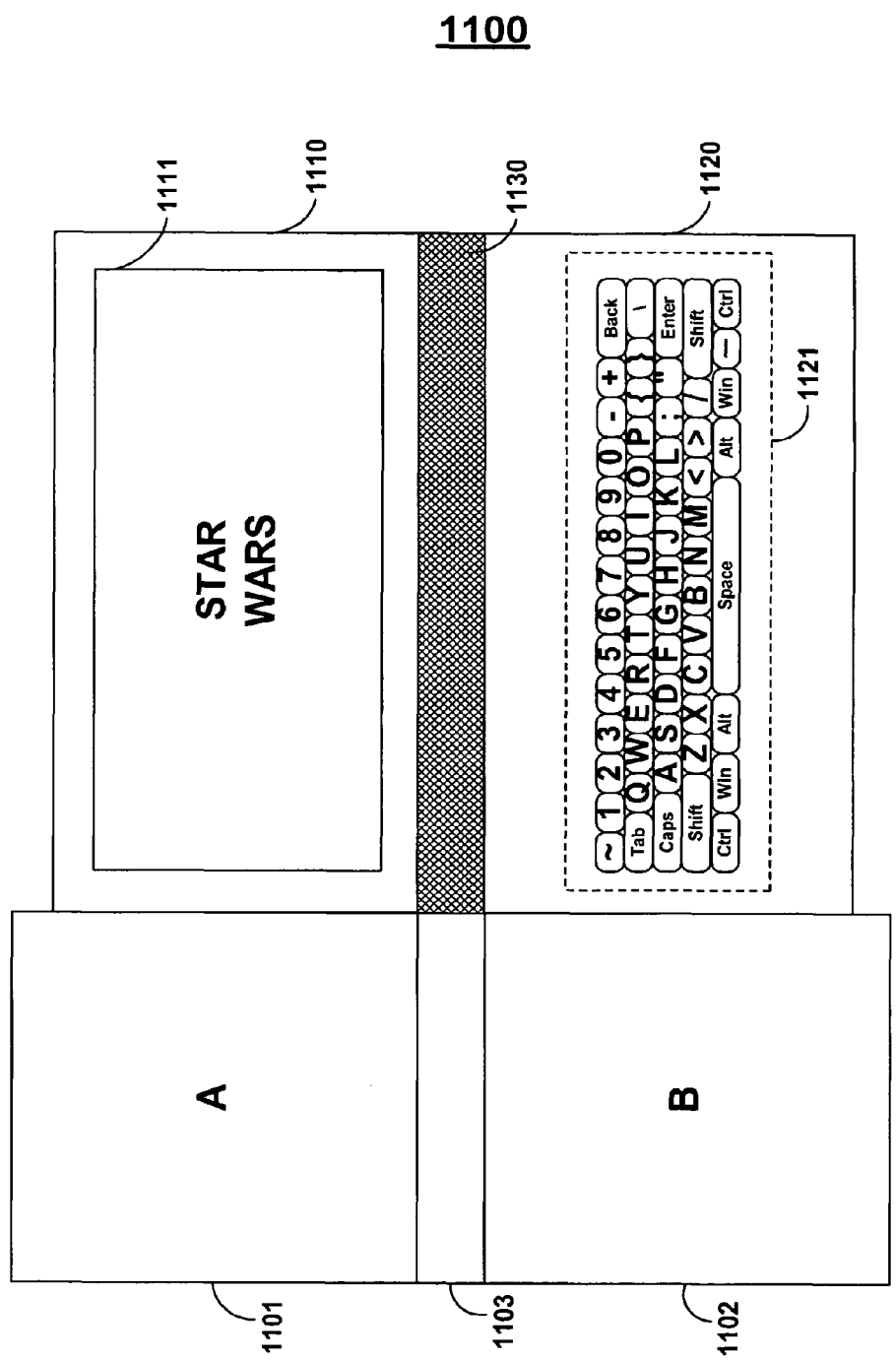
FIG. 11 is an illustration of a foldable portable device in an expanded configuration constructed in accordance with the principles of the present invention.

FIG. 11 shows device 1100 that includes housing portions 1101 and 1102 coupled to hinge 1103. Flexible component 1110 may be provided with flexible display 1111 that may extend from, and retract into, housing 1101. Alternatively, flexible component 1120 may be provided with flexible keyboard 1121 that may extend from, and retract into, housing 1102.

Flexible component 1110 and flexible component 1120 may be coupled together via flexible component 1130. Alternatively, flexible components 1110 and flexible components 1120 may be provided as the same flexible component. Component/portion 1130 may retract into a hollow portion of hinge 1103.

Persons skilled in the art will appreciate that no housing may be provided in a portable device. For example, a flexible keyboard and a flexible display may be housed in a single flexible component (e.g., a single flexible component 1110) which may be, for example, one or more pieces of a sturdy, transparent polymer. Such an portable device may then be flexed in any manner (e.g., rolled like a map) and may be utilized with a variety of external support structures (e.g., a desk) or support structures attached to the one or more flexible components (e.g., one or more long piece of hard plastic that may pivot on an end of the one or more flexible components).

Regardless of whether a device can be flipped open or closed, a device can contain a non touch-sensitive flexible screen, a touch-sensitive flexible screen, and or a flexible input device. Combinations of the various types of input and flexible components may provide numerous advantages. For example, a device can include a non touch-sensitive flexible display screen located above a touch-sensitive flexible display screen (or just a touch-sensitive flexible screen may be provided as the flexible and extendable components for the device). Such a touch-sensitive display can display indicia on the display and a processor can determine if the area in which the indicia was provided was touched by a user. Thus, a touch-sensitive display can display a virtual representation of any type of input device and then determine if a user is touching any of the controls (to then execute functions associated to these controls). Combining a touch-sensitive with a non touch-sensitive flexible display cuts down on production costs and also conserves power. At times a processor can display a single image, or interface, on both the touch and non touch-sensitive displays. For example, if a user is desirous of watching a movie, the movie can be split into two portions and each portion can be displayed on both the touch sensitive and non touch sensitive displays.

Figure 12:
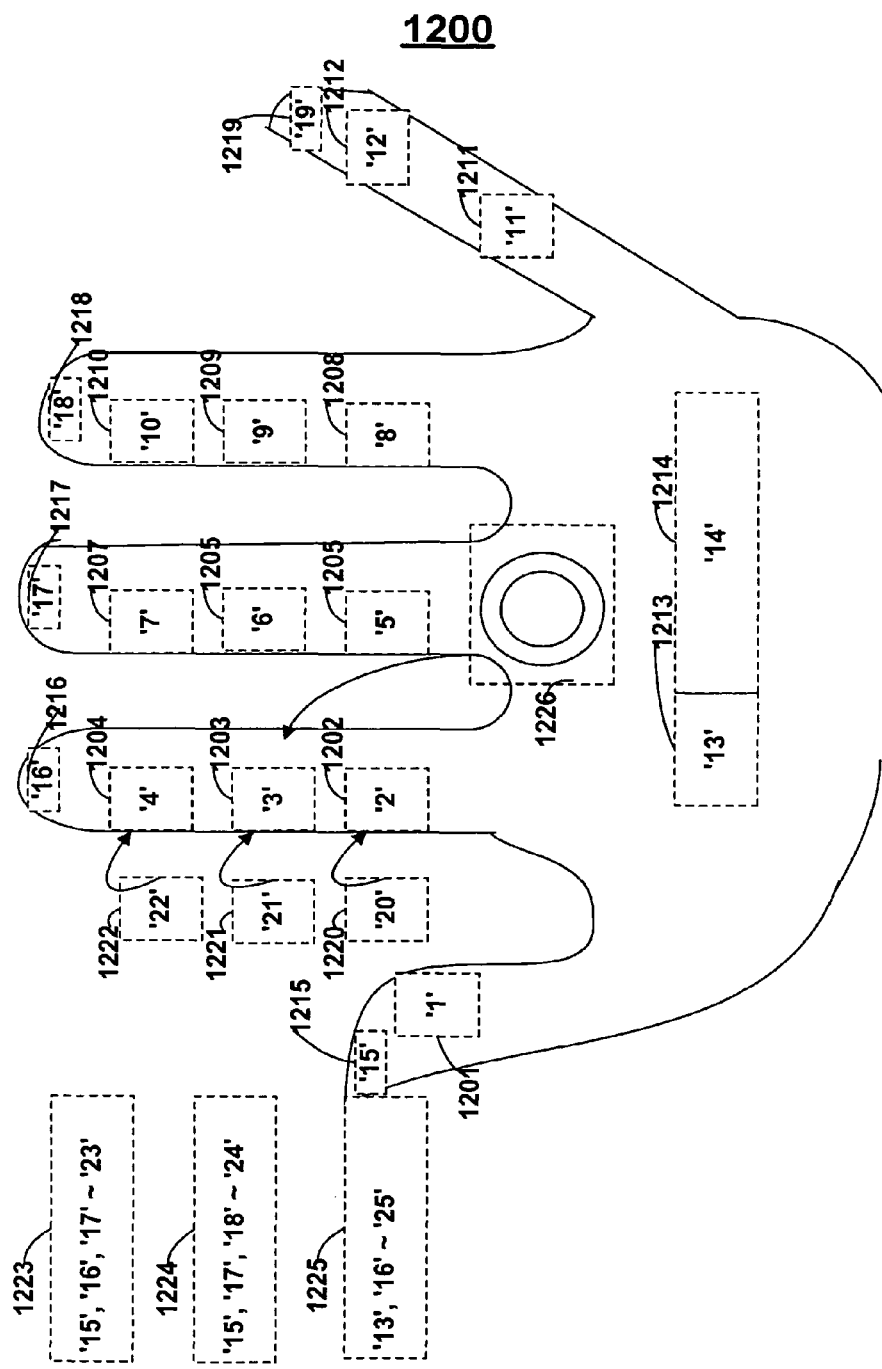
FIG. 12 is an illustration of a glove-based input device constructed in accordance with the principles of the present invention.

FIG. 12 shows input glove 1200 that may exhibit similar functions to, for example, a standard computer keyboard. Generally, the glove operates as follows. Electrical contacts may be placed around the glove such that when two electrical contacts are electrically coupled together (e.g., as a result of a particular hand movement}, a processor connected to the contacts executes a function associated to that action. In this manner, one glove action may result in the letter "S" being activated while another may result in the letter "U" and yet another may result in the letter "E". In this manner, a user may spell "SUE" with three simple hand actions. More particularly, the hand actions needed to provide an input do not have to be difficult (e.g., a hand-sign}, but the simple touching of two or more fingers together or one or more finger to the palm of the hand. In this manner, a simple, economical input glove may be provided. Combined with a head-monitor a user may easily perform any function that the user can perform on a keyboard on one or more gloves of the present invention.

Glove 1200 may include any number of contacts 1201-1222. Particular contacts may be SENSE contacts. Other contacts may be POWER contacts. Moreover, each contact may have both SENSE and POWER portions. For example, contact 1201 may be a POWER contact and may provide an electrical signal that is detectable by, for example contact 1202 that may be SENSE contact. In this manner, a processor or other circuitry (not shown} may denote INPUT "2" when contacts 1201 and 1202 electrically couple together. Accordingly, a processor or other circuitry (not shown} may denote INPUT "3" when contacts 1201 and 1203 electrically couple together.

Persons skilled in the art will appreciate that it may not be desirable to have electrical signals flow between contacts of a glove. Other sensing means may therefore be provided. For example, contact 1201 may be made of a particular material, or given a particular electric field such that the capacitance of contact 1202 changes when the two electrically couple (or are in the vicinity of one another). In this manner, a processor, or other circuitry, may determine the change in a capacitance, or wait for the capacitance of a contact to fall into a particular range of capacitances, to determine when an INPUT has been activated. Other electrical properties may be sensed in a similar fashion to provide a functional glove. For example, sensing and changing the impedance of a contact may provide the function of an input glove.

Alternatively, the electromechanical switches/relays described above in connection with, for example, system 300 of FIG. 3 may be utilized as one or more contacts for a glove. Alternatively, the capacitive, or electrical property, sensing of glove 1200 may be utilized in system 300 of FIG. 3 as a flexible input device (e.g., a flexible keyboard).

Combinations of contacts touching one another may also be utilized as different inputs. For example, combinations 1223-1225 may be provided. Looking at combination 1223, contacts 1215, 1216, and 1217 may provide a particular input (e.g., INPUT 23) when all three are, for example, electrically coupled together. Particular actions may be associated to particular INPUTS. In this manner, INPUT 23 may, for example, minimize an application, or toggle between applications.

Persons skilled in the art will appreciate that glove 1200 may provide a large number of controls with very simple, easy to learn point-to-point in-hand contacts. Such point-to-point hand contacts in-hand contacts may be performed very quickly such that an experienced user may, for example, achieve a rather high words-per-minute typing average.

Additional inputs may also be provided on glove 1200. For example, a small finger-controlled joystick or non-flexible touch-screen may be provided on glove 1200 to provide a mouse-type control. Such a finger joystick may be positioned anywhere on glove 1200. One particularly useful position would be substantially around the area defined by contact 1203. Contacts 1204 and 1202 (which may be electromechanical switches/relays) may then provide, for example, the functionality of mouse-buttons. Thus, a person walking could easily scroll through a webpage, and click on links, that are displayed, for example, on portable device 900 of FIG. 9

Persons skilled in the art will appreciate that more than one input glove (e.g., 2) may be utilized by a user to increase the number of inputs utilized (or the simplicity of remembering a particular associations between hand-actions and inputs).

Figure 13:
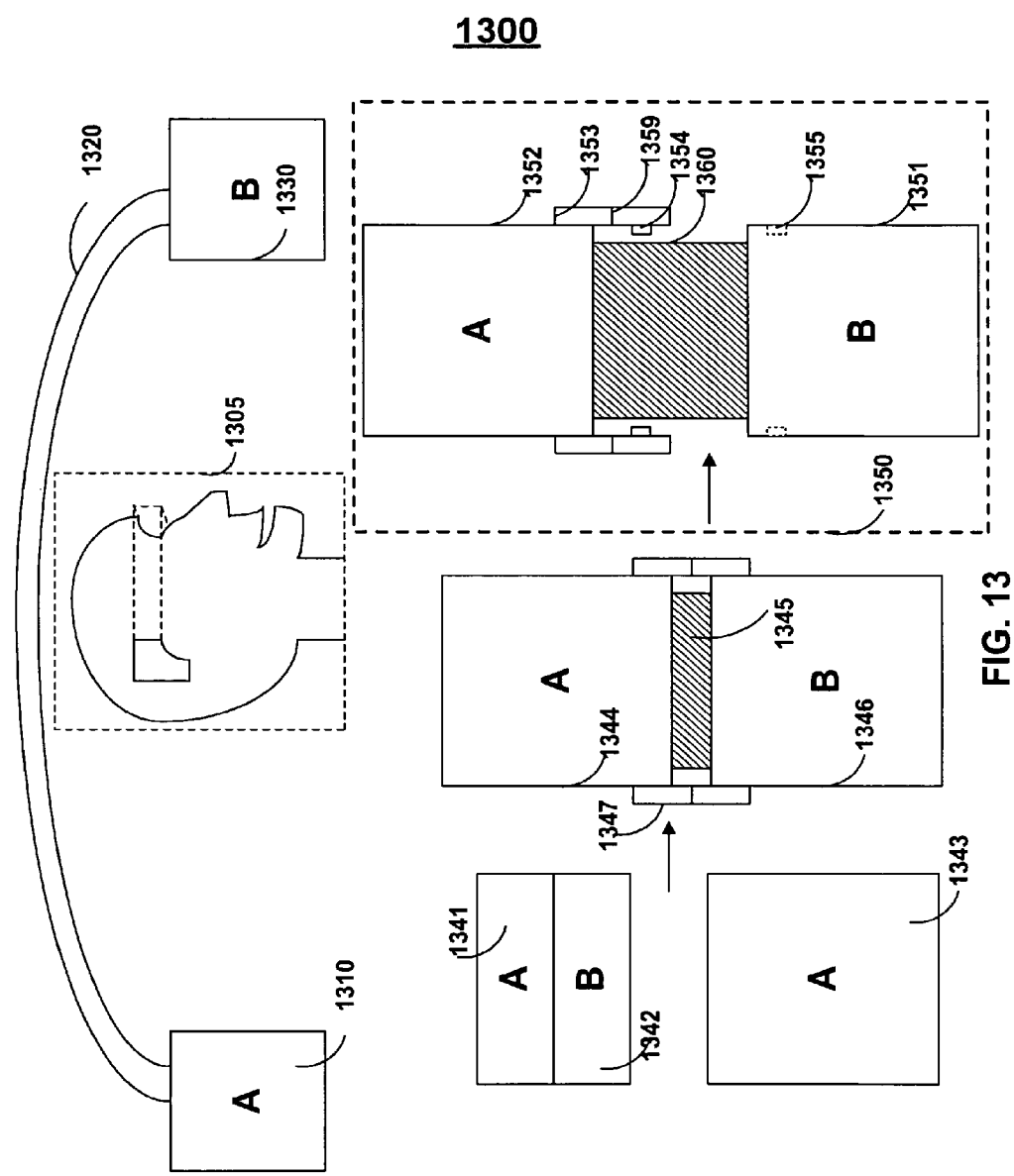
FIG. 13 is an illustration of a device constructed in accordance with the principles of the present invention.

FIG. 13 shows head-mounted device 1300 that may include stacked housing portions 1341 and 1342 (with a top-perspective of perspective 1343).

Device 1300 may be a flip-open device that includes housings 1344 and 1346 such as a wireless telephone that can be flipped OPEN and CLOSED. Housings 1344 and 1346 can include one or more extendable, and retractable, flexible display screens and/or input devices. For example, housings 134 and 1346 may each house a portion of a common flexible display 1345. One or more hinging structures 1347 may be provided to provide the flip-open functionality.

Configuration 1350 is provided as an example of how a flip-open head-mounted display can be provided. Configuration 1350 includes housings 1351 and 1352 that house a common flexible screen 1360 (e.g., each housing 1351 and 1352 includes an axle that a portion of flexible screen 1360 can be wound around). Hinging structure 1353 may be unmated with one of housings 1351 or 1352 such that the flexible display can be extended from one or more housings 1351 or 1352. Persons skilled in the art will appreciate that each housing may include a separate flexible component or that only one housing may extend, and retract, flexible components. Hinging structure 1353 may hinge at point 1359 and include mateable member 1353 (e.g., a male member) to mate with housing mateable member 1355 (e.g., a female member). Mateable members 1353 and 1355 can be configured to, for example, snap or mechanically lock together. When unextended a flip-open head-mounted display, or any type of head-mounted display, can be provided as housings 1310 and 1330 such that it can be mounted on a head as shown in configuration 1305.

Figure 14:
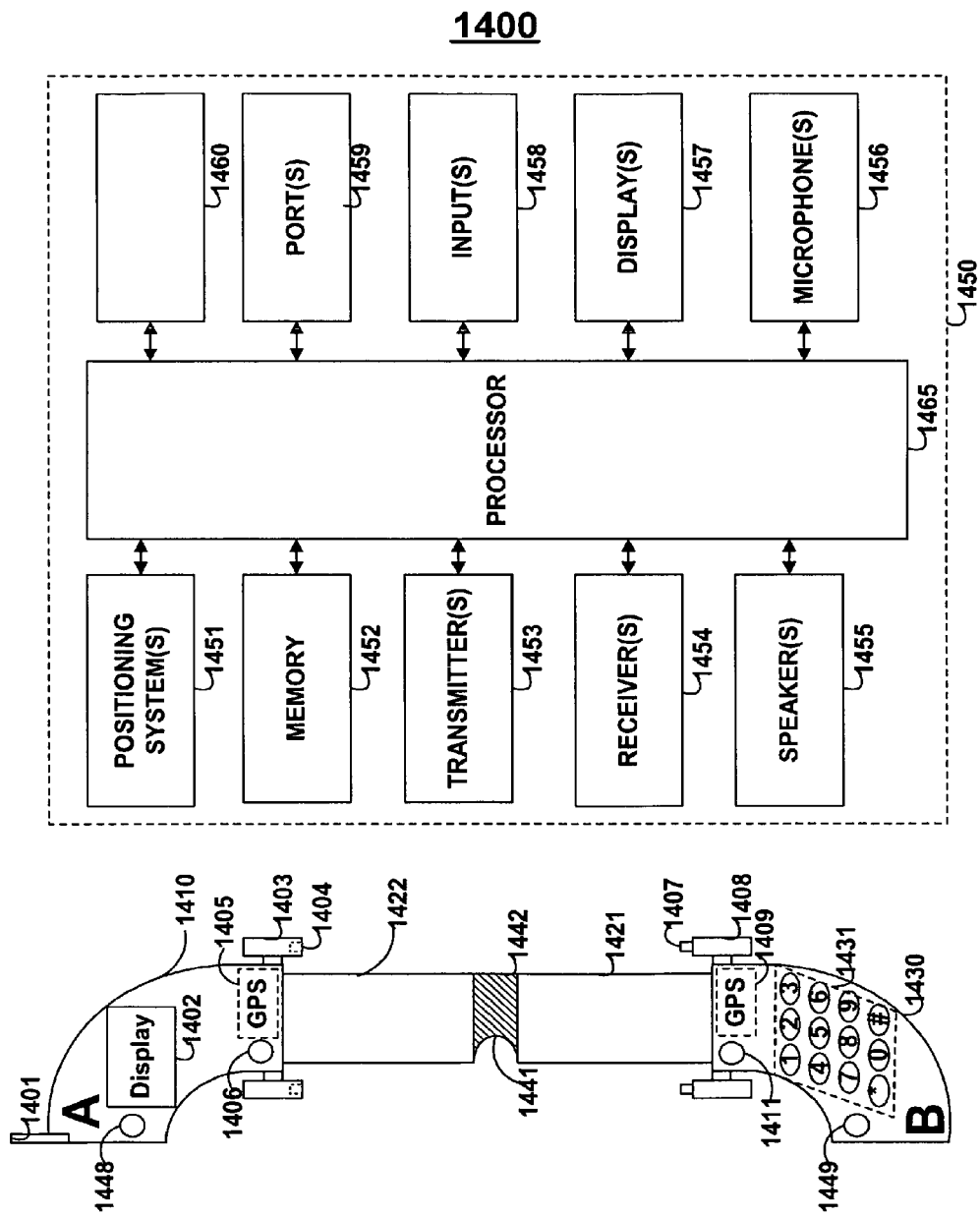
FIG. 14 is an illustration of a device constructed in accordance with the principles of the present invention.

FIG. 14 shows wireless telephone 1400 that can be utilized as a head-mounted computing system. Wireless telephone 1400 may include, for example, housings 1410 and 1430 that are mateable via mating structures 1407 and 1404. Hinging structures 1403 and 1408 may allow for the wireless telephone to provide, for example, the opportunity for a user to flip-open and flip-closed the wireless telephone when the housings are mated together. As such, a user can minimize the surface area of the device by flipping the phone closed and flip the phone open when, for example, only telephonic features are needed. Persons skilled in the art will appreciate that a flipped open, but mated, configuration has a decreased surface area compared to a flipped-open, unmated, and flexible components extended configuration. When a user desires to use flexible components (e.g., a flexible display screen) the user can unmate the housings and interact with the flexible components. A touch-sensitive display screen can be provided so a user can use the display as a keyboard. The touch-sensitive feature can be turned off to just provide a display screen (e.g., via a manual input such as a button) such that power is conserved if the—ability to provide a head-mounted device is provided.

A common flexible component can be housed in housings 1410 and 1430. Alternatively, housing 1410 can house flexible component portion 1422 and housing 1430 can house flexible component portion 1421. Portions 1421 and 1422 may be separate flexible components fixed together via guard layer 1442 or may be portions of the same flexible display that is protected by guard layer 1442. Cutout 1441 may be provided such that, for example, the display better fits against a portion of the body. For example, cutout 1441 may be configured to receive a nose. Guard portion 1442 may provide protection when the device is flipped open, but mated, as in such a configuration guard 1442 may not be housed in any housing portion (e.g., guard 1442 may always be unprotected). Guard 1442 may be one or more layers of a strong transparent polymer (in which case, guard 1442 may extend across both flexible portion 1422 and flexible portion 1421. Alternatively, guard 1442 may be a piece of hard material such as a non-flexible plastic. Such a non-flexible portion may provide support for display portions 1422 and 1421 when in a head-mounted position such that flexible portions 1422 and 1421 do not change locations (with respect to a head) while a person is in motion (e.g., while walking).

Each of housings 1410 and 1430 may include a number of components that add functionality to a head-mounted display screen processing system. For example, one or more housings may include a GPS, or other locating receiver, such that location information can be obtained and utilized. If one GPS receiver is placed in each housing (e.g., on either side of the head), then the direction that a user is facing can be determined by utilizing the difference in the two locations. Accelerometers, or another inertial detection system, may be provided in one or more of the housings to update location information between reception of GPS, or other locating, updates. Tilt sensors may also be provided in one or more of the housings to determine the angle that a user's head is pointed in. Signals from accelerometers and tilt sensors (or other movement sensors) can be utilized as a control signal. For example, if a user moves an email using a remote trackball (e.g., trackball 1850 of FIG. 18 to a virtual trashcan, the user may be provided with a visual prompt on a display screen (or an audio prompt via a speaker) that requests if the email should be purged. Motion sensors can sense a user nodding up-and-down (e.g., nodding YES) or a user nodding left-to-right (e.g., nodding NO) to determine if the email should be purged or not (e.g., to answer the question posed by the processor).

Each housing may include one or more microphones. If a user is in a phone conference using the telephonic systems of device 1400 while in a head-mounted position, information received from all, or some, of the microphones may be utilized to, for example, reduce noise. Thus, a user can speak relatively far away from the microphone (e.g., can speak normally, while the microphone is located on the side of the head) and noise can be filtered out. For example, sound information received from the microphone(s) of housing 1410 can be compared to the sound information received from the microphone(s) of housing 1430 to determine not only noise, but also audio feedback from the speakers included in device 1400. In determining feedback, one skilled in the art will appreciate that both microphones may pick up ambient noise and sounds from the environment, but housing 1410 is more susceptible to audio feedback from a speaker in housing 1410 while housing 1430 is more susceptible to audio feedback from a speaker in housing 1430. Thus, the differences in audio information received can be used to help detect such audio feedback and used to manipulate the audio played by the speakers (or manipulate the audio information as it is processed) to reduce feedback. Each housing 1410 and 1430 can also include independent signal processing circuitry that does not use information shared by the other housing. Persons skilled in the art will appreciate that additional housings may be included in device 1430. For example, an additional processing housing may be provided or a detachable remote control can be provided.

Device 1400 can also include numerous other types of components such as display 1402 and input controls 1431 (e.g., which may be utilized when the device is flipped-open but mated). Microphones 1411 and 1406 and speakers 1448 and 1449 may be included. Antenna 1401 may also be provided such that device 1400 has a wireless communications ability.

System topology 1450 may be included in device 1400. System topology 1450 may include any number of positioning systems 1451, memory 1452, transmitters 1453, receivers 1454, speakers 1455, processors 1465, additional components 1460, ports 1459, inputs 1456, displays 1457, and microphones 1456. A power source may also be provided in topology 1465.

Figure 15:
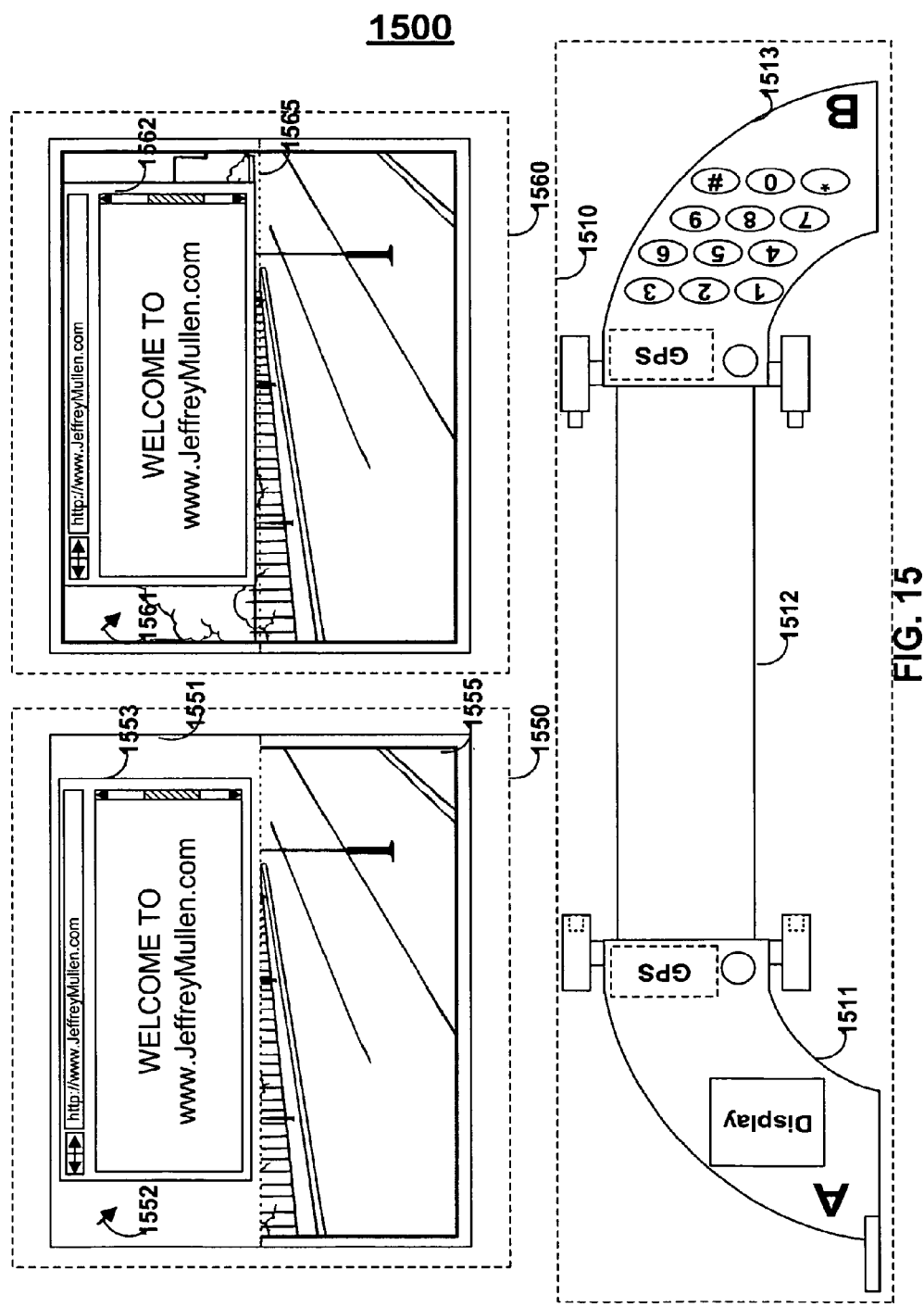
FIG. 15 is an illustration of a device constructed in accordance with the principles of the present invention.

FIG. 15 shows head-mounted device 1500 that may be embodied as, for example, configuration 1510 in which a single flexible display 1512 is partially housed in housing portions 1511 and 1513. Persons skilled in the art will appreciate that any type of programs may be run to provide any type of interfaces on a head-mounted display of device 1500 (or, for example, device 1700 of FIG. 17). As such, a user can be provided with any functionality that user could obtain from using a stationary computer. For example, a user can browse the internet, check his/her email, undergo word-processing activities (e.g., editing pictures, writing documents, making spreadsheets, coding webpages), instant message friends, communicate with audio (e.g., using Voice Over Internet Protocol or VoIP), or provide any other process that a computer can provide. Thus, a user can be provided with a wireless telephone (which may not even be cellular based, but may communicate using only VoIP) that can be extended (e.g., by rolling out a flexible head-mounted display for when the user is in motion or by forming a tablet PC by providing structural supports for when a user wants to sit down and perform just computing functions).

A flexible display may not be transparent such that a user cannot see his/her environment through the display or the flexible display may be transparent such that images can be provided to augment the user's reality.

Display configuration 1550 may be provided either via hardware or software. Configuration 1550 may include a non-transparent display portion 1551 and a transparent display portion 1550 {or a non-display transparent portion). As such, a user can walk down the street and see his/her environment and look at a display screen when he/she wants to. Such a non-transparent display screen can be provided via software by filling up a portion of a display screen with images (e.g., a background with cursor 1552 and browser 1553). Configuration 1660 is also provided in which virtual objects are placed on a display without a background such that a user can interact both in a virtual world and an actual environment at the same time. For example, virtual cursor 1561 may be provided with virtual web browser 1562. Virtual objects may also include, for example, virtual map indicators (e.g., an arrow pointing towards where a friend is located that has provided permission for you to locate them), augmented reality game objects (e.g., a video game character), and any other type of virtual object. Display 1560 may be provided with a mode in which virtual objects are limited to a particular portion of a display. Such a mode may be turned ON and OFF by a user such that the user can maximize his/her virtual work area when, for example, that user is sitting as a passenger in a car. By limiting virtual objects on just a portion of a display (e.g., the portion above perimeter 1565), a user may not only be prohibited from moving virtual objects outside this perimeter, but a virtual bifocal feature may be provided such that when a user looks up . . . an augmented environment is provided and when the user looks forward, an actual environment is provided. A user could then, for example, move the display across his/her nose like bifocals can be moved to also manually toggle between the two perspectives.

Figure 16:
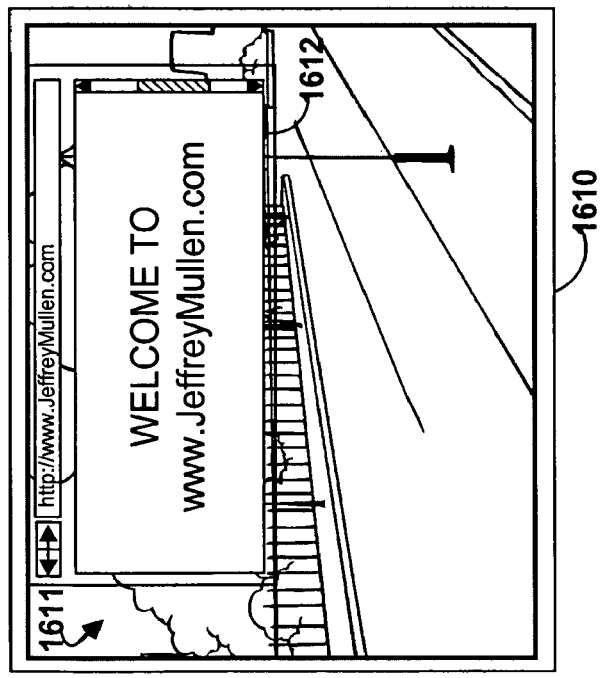
FIG. 16 is an illustration of a display constructed in accordance with the principles of the present invention.

FIG. 16 shows display configuration 1600 that may be utilized, for example, by a head-mounted device. Display configuration 1600 may include a distance-locked virtual object such as virtual object 1612 always appears in the same location, at the same distance, from a user. As such, a web browser may be virtually placed, for example, 20 yards away from a user in the sky. A processing system may utilize tilt, movement, and location systems to, for example keep the virtual object in an exact location. Alternatively, information from tilt, movement, an location systems, may be utilized for example, to provide a virtual object at a locked-distance and/or a locked-angle. Thus, a user may be provided with targeted advertisements for particular locations. Moreover, a user walking down the street can check his or her email and be provided with a virtual email object locked at a particular distance and pitch. Thus, if a user needs to look to the ground because he dropped his/her wallet, he/she will not be provided with virtual objects as he/she will not have the correct pitch (e.g., angle from a reference) to view the pitch-locked and distance-locked virtual object. When the user looks back up and continues walking, the virtual email object may always be at the same distance (which a user can change to maximize viewing preferences) and at the same pitch. Thus, a user can walk down the street and turn his/her head slightly right at a particular pitch to see his email and turn his/her head slightly left at a particular pitch (e.g., the same pitch) to see a web browser. Direction-lock can also be added such an object can only be looked at when a user is looking in a particular direction (e.g., North or South). The parameters of all such locks (e.g., directional, pitch, and location) can be changed at any time.

Persons skilled in the art will appreciate a number of sensors can be added to increase the functionality of a head-mounted device. For example, a video and/or still picture camera can be provided such that images can be taken and, if desired, transmitted wirelessly. Multiple types of cameras can be utilized. For example, infrared and night vision cameras can be utilized. The information received from these cameras can be displayed on the display screen. Thus, a non-transparent display screen can be utilized but provide a transparent feature by feeding in video information in, for example, real time of the environment in the user's field of vision. A camera can also be pointed outside a user's field of vision. Thus, a soldier can be provided with image data of the environment behind him/her such that the chances of a soldier being surprised are decreased. Such cameras can also have zoom features such that a soldier can zoom into a particular object (e.g., virtual binoculars can be provided).

Figure 17:
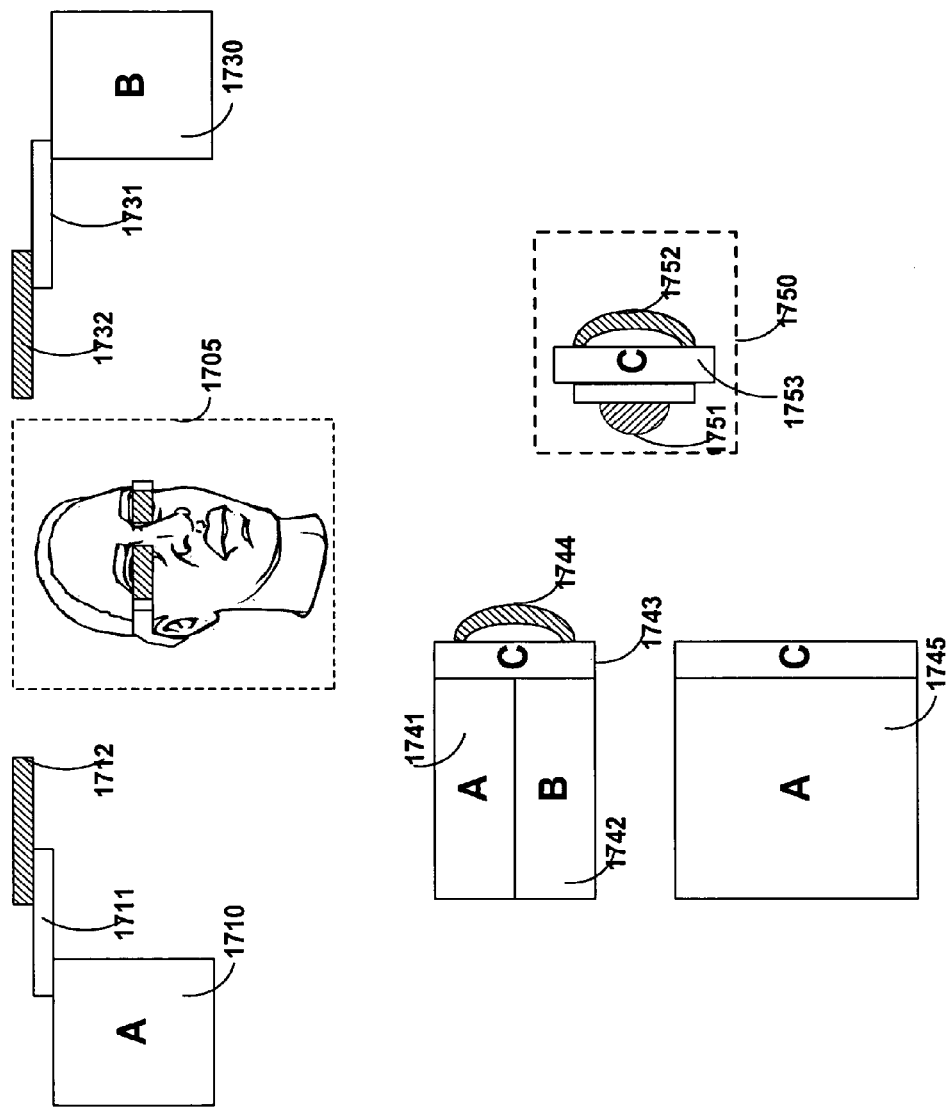
FIG. 17 is an illustration of a device constructed in accordance with the principles of the present invention.

FIG. 17 shows device 1700 that may include portions 1741 and 1742 which may be, for example, similar to portions 1710 and 1730, respectively. Portion 1710 includes display 1712 and extension 1711. Extension 1711 may be provided, for example, on rails or on a hinge to portion 1710 (and display 1712 may be provided on rails, or on a hinge to extension 1711) Display 1712 may be non-flexible such that, for example, non-flexible display configurations can be utilized. Persons skilled in the art will appreciate that a non-flexible display may be a flexible display enclosed in a non-flexible frame. As a result of the non-flexible attribute, the size of the display can be minimized to only cover an eye. An image projector {not shown) may be provided on portion 1710 to project an image on a portion of display 1712. As such, display 1712 may be a non-display screen configured to receive a projected image. Portion 1730, extension 1731, and display 1732 may be similar to portion 1710, extension 1711, and display 1712, respectively. Device 30 1700 may have, for example, only one eye-display portion (e.g., only portion 1710) or two eye-display portions (e.g., display portion 1710 and 1730). Using two eye-display portions, configuration 1705 may be provided. Any head mounted housing may be shaped to be fitted behind the top of an ear. A speaker may be extendable from such housing to increase the magnitude of the sound reaching the ear such that less power can be spent on projecting audio from a speaker. Similarly, a microphone may extend downwards towards a user's mouth.

Remote control component 1743 may be mateable with portion 1710, 1730 or both. Similarly remote control component 1743 may be mateable with portion 1741, portion 1742, or both. An input glove may also be provided such that a user can control and manipulate virtual objects displayed on a display screen. Remote control 1743 may simple in nature. For example, remote control 1743 may include band 1744 to fit to a portion of a user's body {e.g., to fit around one or more fingers, the back of a hand, or a wrist). One such remote control is remote control 750 that includes housing 1753, band 1752, and trackball 1751 {or, for example, an analog joystick). Trackball 1751 may be pressure sensitive such that pressing down on trackball 1751 is a separate control signal (e.g., a mouse click) from a directional control signal. Thus, a user could put remote control around his/her middle finger and control the trackball (or a joystick such as an analog joystick) with his/her thumb. As such, a user can scroll through a webpage while walking down the street, clicking on links by applying pressure to the trackball (or joystick). Additional actions may be provided, for example, by holding down a trackball for at least a period of time (e.g., 1 second) or clicking the trackball twice within a period of time {e.g., 1 second).

FIG. 18 shows device 1800 that may include mateable housing portion 810 and remote control portion 1820. Housing portion 1810 may have a non-flexible eye display. For example, housing 1810 may be head-mounted device 1830 that includes housing 1831 {e.g., which may contain processing circuitry etc), extension 1832, and display 1833. The components of any head-mounted system may communicate to each other wirelessly or via wire. For example, remote control 1850 may wireless communicate to housing portion 1810. If two eye displays are provided, these two display devices can communicate with each other and remote control 1850. An additional housing may include primary processing circuitry and may communicate wirelessly with the two eye display deices and the remote control. As such, for example, a user can have the main processing circuitry have a cell phone in his pocket while wearing a head-mounted display and holding a remote control. The user may, for example, be visually prompted (e.g., remotely notified) that a call is being received via a Bluetooth connection. That user may then click a YES virtual object instead of a NO virtual object using remote control 1850 to connect the call. The processing device in the user's pocket can use one type of wireless transmission (e.g., cellular) to obtain incoming call data (e.g., incoming audio), forward this information via a second type of wireless transmission (e.g., Bluetooth) to the head-mounted display so the information can be played to a user, and then receive information from the head-mounted display (e.g., audio information) from the second transmission channel and forward that information back through the first transmission channel to the caller. Thus, a user does not have to move any portion of his/her body, other than a single finger, to receive and answer a phone call. A user would not have to move his hand or arm.

Remote control 1850 may include a number of input controls such as buttons 1854 and 1856 in addition to trackball 1852 (e.g., a pressure-sensitive trackball). Such controls may be on one or more structures 1853 and 1855 that extend from primary remote control housing 1851. Structures 1852 and 1855 may be, for example, spring loaded, the release of which is controlled by a button (not shown). Such structures may be retractable and may snap back into primary housing 1851. Persons skilled in the art will appreciate that a remote control or a head-mounted display device may include primary computational circuitry.

Figure 19:
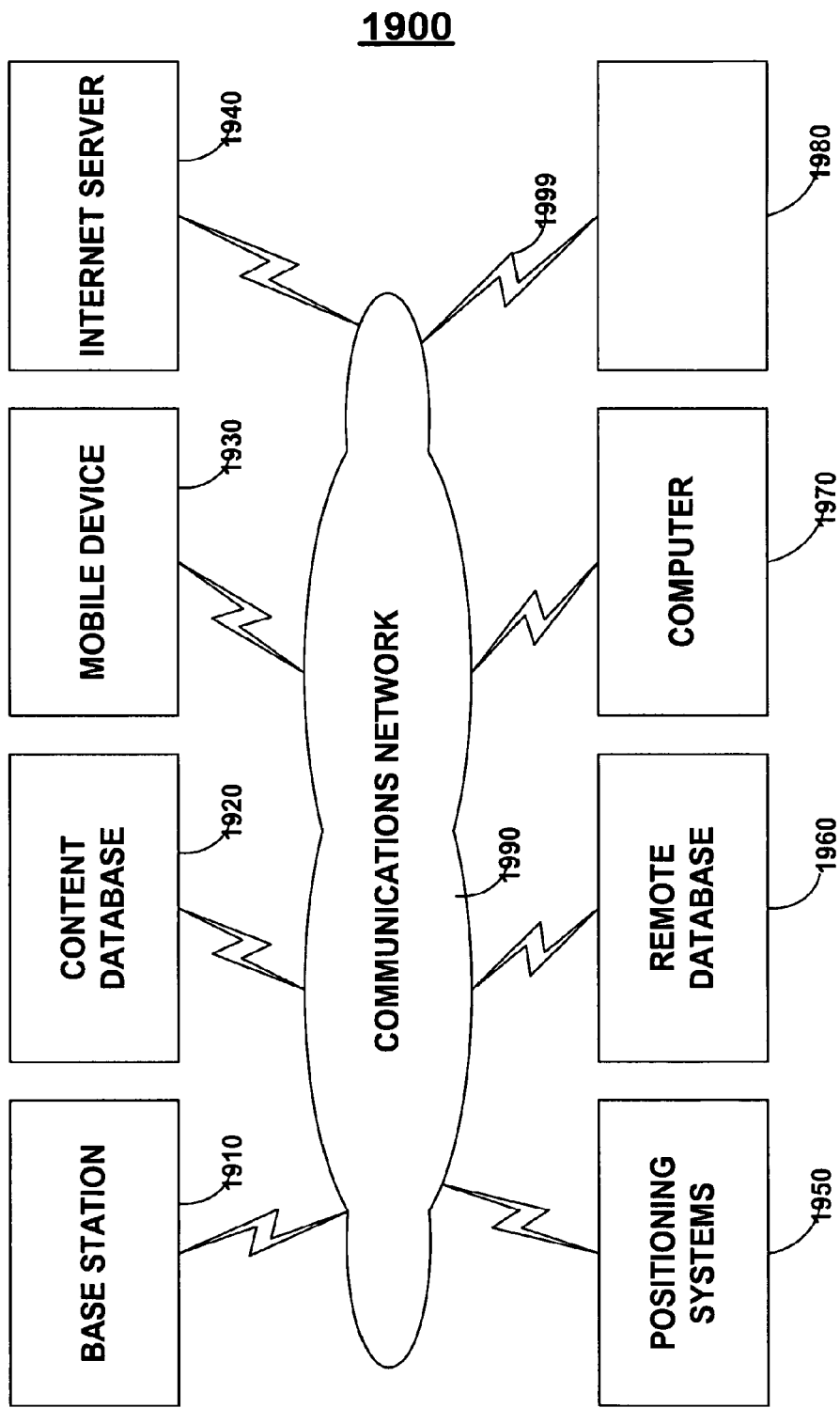
FIG. 19 is an illustration of a network topology constructed in accordance with the principles of the present invention.

FIG. 19 shows network topology 1900 that a device of the present invention may connect to (e.g., a device having a flexible component or a head-mounted device). Network topology may include base station (e.g., for wireless communications to network 1990), content database 1920, mobile device 1930, internet server 1940, positioning systems 1950, remote database 1960, computer 1970 (e.g., a stationary computer), and additional systems 1980. Remote database 1960 may be utilized to remotely store information e.g., remotely store location information for augmented reality games, location-based games, or for locating features). Any system of topology 1900 may communicate to network 1990 via a wireless or wire-based communications link 1999.

It will also be recognized that the invention may take many forms other than those disclosed in this specification. Accordingly, it is emphasized that the invention is not limited to the disclosed methods, systems and apparatuses, but is intended to include variations to and modifications thereof which are within the spirit of the following claims.

What is claimed is:

1. A head-mounted device comprising:
  a source of power;
  a first head-mounted housing comprising:
    a first speaker;
    a microphone;
    a first locating device;
  a second head-mounted housing comprising:
    a second speaker;
    a second locating device;
  a transparent display screen operable to cover at least single user eye such that at least a portion of the user environment in front of said transparent display screen is operable to be perceived through said transparent display screen, wherein a virtual object is displayed on said transparent display; and
  a camera, wherein information from said camera are displayed on said transparent display.

2. The head-mounted device of claim 1, wherein said first head-mounted housing further comprises a manual input interface.

3. The head-mounted device of claim 1, wherein said first head-mounted housing further comprises an accelerometer.

4. The head-mounted device of claim 1, wherein said first head-mounted housing further comprises a movement sensor.

5. The head-mounted device of claim 1, wherein said transparent display screen is non-flexible.

6. The head-mounted device of claim 1, wherein said virtual object is a web browser.

7. The head-mounted device of claim 1, wherein said virtual object is associated with a map.

8. The head-mounted device of claim 1, wherein said virtual object is a virtual email object.

9. The head-mounted device of claim 1, wherein said virtual object is a distance-locked virtual object.

10. The head-mounted device of claim 1, wherein a location-associated advertisement is displayed on said transparent display.

11. The head-mounted device of claim 1, further comprising a processor.

12. The head-mounted device of claim 1, wherein said virtual object is a virtual map indicator comprising an arrow pointing toward a location.

13. The head-mounted device of claim 1, further comprising a wireless communications antenna.

* * * * *